(12) United States Patent
Jittou et al.

(10) Patent No.: US 9,007,668 B2
(45) Date of Patent: Apr. 14, 2015

(54) IMAGE READING SYSTEM, INFORMATION PROCESSING APPARATUS, AND STORAGE MEDIUM

(71) Applicant: Canon Denshi Kabushiki Kaisha, Chichibu-shi (JP)

(72) Inventors: Toshifumi Jittou, Chichibu (JP); Kouji Miyanishi, Chichibu (JP)

(73) Assignee: Canon Denshi Kabushiki Kaisha, Chichibu (JP)

( * ) Notice: Subject to any disclaimer, the term of this patent is extended or adjusted under 35 U.S.C. 154(b) by 0 days.

(21) Appl. No.: 14/044,093

(22) Filed: Oct. 2, 2013

(65) Prior Publication Data

US 2014/0071505 A1  Mar. 13, 2014

Related U.S. Application Data

(63) Continuation of application No. PCT/JP2012/002310, filed on Apr. 3, 2012.

(30) Foreign Application Priority Data

Apr. 6, 2011 (JP) .................................. 2011-084741
Jun. 23, 2011 (JP) .................................. 2011-139191

(51) Int. Cl.
*G06F 3/08* (2006.01)
*G06F 15/00* (2006.01)
(Continued)

(52) U.S. Cl.
CPC ............... *H04N 1/56* (2013.01); *H04N 1/6027* (2013.01); *G06T 5/009* (2013.01)

(58) Field of Classification Search
CPC ........ H04N 1/56; H04N 1/6027; G06T 5/009; G06K 15/02

USPC ........... 358/519, 521, 1.9, 1.1, 1.15; 356/610, 356/73; 345/601, 690; 382/162
See application file for complete search history.

(56) References Cited

U.S. PATENT DOCUMENTS 6,999,213 B2  2/2006  Kinumura et al.
7,573,532 B2  8/2009  Shimazaki et al.
(Continued)

FOREIGN PATENT DOCUMENTS

JP  1-317075 A  12/1989
JP  11-146220 A  5/1999
(Continued)

OTHER PUBLICATIONS

International Search Report and Written Opinion mailed Jun. 26, 2012, in International Application No. PCT/JP2012/002310.

*Primary Examiner* — Douglas Tran
(74) *Attorney, Agent, or Firm* — Fitzpatrick, Cella, Harper & Scinto

(57) ABSTRACT

In an image reading system, when an automatic determination mode is designated as a color mode, a scanner does not determine the color of the read image but applies gamma correction to the image data of the image using the first correction characteristic. The scanner transmits the resultant image data to a PC. The PC determines the color of the image indicated by the received image data. When the determined color does not correspond to the first correction characteristic, the PC performs gamma correction of the received image data in accordance with the inverse characteristic of the first correction characteristic and then performs gamma correction using the second correction characteristic corresponding to the determined color.

14 Claims, 24 Drawing Sheets

(51) Int. Cl.
*G06K 1/00* (2006.01)
*H04N 1/56* (2006.01)
*G06T 5/00* (2006.01)
*H04N 1/60* (2006.01)

(56) References Cited

U.S. PATENT DOCUMENTS

| | | | |
|---|---|---|---|
| 7,889,917 B2 * | 2/2011 | Minamino | 382/162 |
| 7,916,942 B1 | 3/2011 | Ohara | |
| 7,978,284 B2 | 7/2011 | Hashino | |
| 7,978,384 B2 | 7/2011 | Kinumura et al. | |

FOREIGN PATENT DOCUMENTS

| | | |
|---|---|---|
| JP | 2003-60912 A | 2/2003 |
| JP | 2003-280597 A | 10/2003 |
| JP | 2003-319411 A | 11/2003 |
| JP | 2007-102284 A | 4/2007 |
| JP | 2007-325137 A | 12/2007 |
| JP | 2009-303152 A | 12/2009 |
| JP | 2010-117818 A | 5/2010 |

* cited by examiner

F I G. 14
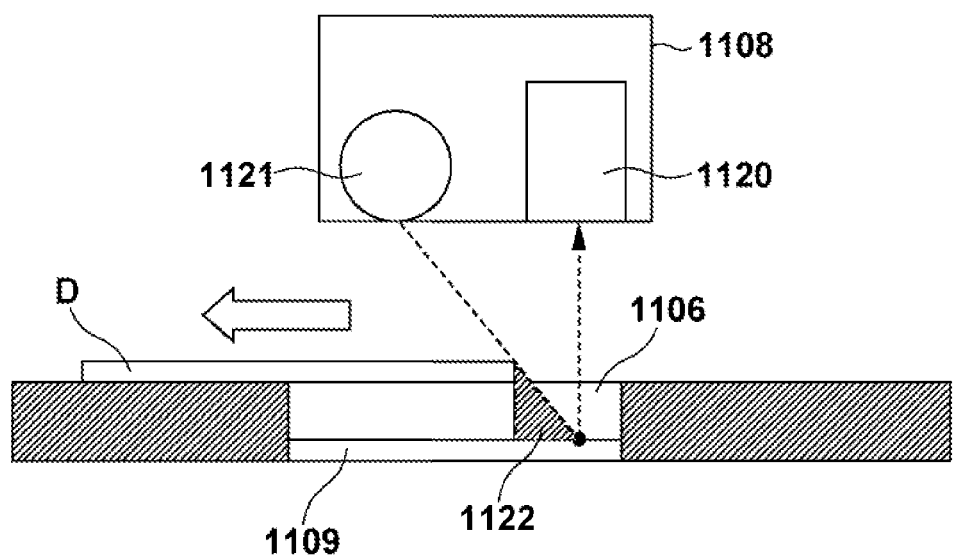

F I G. 24
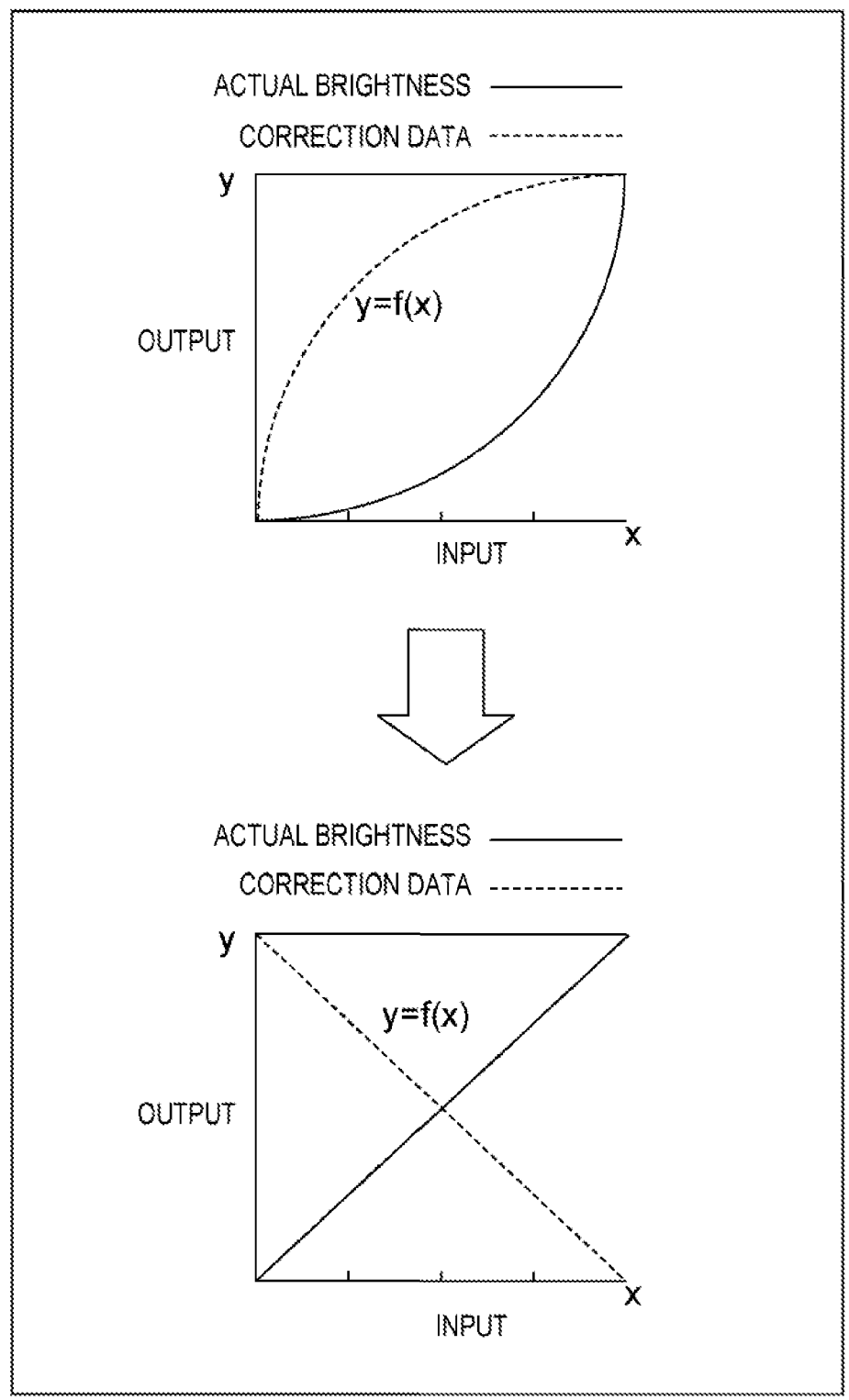

IMAGE READING SYSTEM, INFORMATION PROCESSING APPARATUS, AND STORAGE MEDIUM

This application is a continuation of International Patent Application No. PCT/JP2012/002310 filed on Apr. 3, 2012, and claims priority to Japanese Patent Application Nos. 2011-084741 filed on Apr. 6, 2011, and 2011-139191 filed on Jun. 23, 2011, which are incorporated by reference herein in their entirety.

FIELD OF THE INVENTION

The present invention relates to an image reading system, information processing apparatus, and storage medium.

DESCRIPTION OF THE RELATED ART

There is known a system including an image reading apparatus such as a scanner and an information processing apparatus such as a PC having a wired or wireless connection to the image reading apparatus, wherein the image processing apparatus acquires image data obtained by a reading process of the image reading apparatus. In this system, for example, the following processes are executed in accordance with user operations on the PC to display and store an image read by the scanner on the PC.

First of all, a user installs, in the PC, application software (application) for displaying and storing an image on the PC and scanner control software (driver) for controlling the scanner from the PC. When the user starts the installed application to request image reading to the application, the application transmits an image reading request to the driver. Upon reception of the image reading request, the driver transmits the image reading request to the scanner which has a wired or wireless connection to the PC. Upon reception of the image reading request, the scanner reads an original image set by the user in advance to generate image data corresponding to this image. The scanner transfers the generated image data to the PC driver, and the driver then transfers the generated image data to the application. The application stores the received image data in a memory or the like and displays an image based on the received image data.

In this system, the image data generated by the reading process by the scanner generally undergoes a gamma correction process serving as a process for adjusting the brightness of each pixel (for example, Japanese Patent Laid-Open No. 2003-60912). The gamma correction process is performed, when outputting (for example, displaying or printing) the image based on the image data, to set the brightness of an output image to a brightness level desired by the user or to improve the visibility of the output image. In addition, the gamma correction process performs different correction processes in accordance with the characteristics of the output image. For example, different correction processes are executed in accordance with whether the output image is a multicolor image or monocolor image. This is because the image qualities and visibilities required by the user are different depending on the characteristics of the output images.

In the above system, in order to provide a high-quality image to the user, image data having a large number of tones generally needs to be generated. On the other hand, in order to shorten image data transfer time between the scanner and the PC, the data amount of the image data needs to be reduced by reducing the number of tones of the image data generated by the scanner. For this purpose, in the above system, for example, the following processes are executed to provide a high-quality image to the user without increasing the image data transfer time.

When reading the image, the scanner generates image data having a large number of tones corresponding to the desired quality and applies the gamma correction process to the generated image data in the scanner. In addition, the scanner converts the image data having undergone the gamma correction process into image data whose number of tones is reduced for image data transfer to the PC. The scanner then transmits the resultant image data to the PC. As described above, when the number of tones is reduced after the gamma correction of the image data generated by the reading process, color tonality can be enhanced more than a case in which the gamma correction is performed after the decrease in the number of tones. As a result, the quality of the output image can be improved.

In the above system, the scanner often has a function of automatically determining the characteristics of an image serving as a reading target in order to reduce the user's load of manually changing the reading settings depending on the types of originals. For example, the scanner executes a color determination function of automatically determining using software or hardware whether the read image is a multicolor or monocolor image and generates image data corresponding to the determination result. In this case, this system automatically generates appropriate image data and provides the generated data to the user without causing the user to perform reading settings depending on the color of the original image.

As described above, different correction processes are performed in the gamma correction process depending on the characteristics of the output images. For example, the correction process corresponding to the color of the image is executed depending on whether the output image is a multicolor or monocolor image. For this reason, when the color determination process is generally executed together with the gamma correction process, the color determination process is executed before the gamma correction process. The gamma correction process corresponding to the determined image color is thus applied to the image data.

In an image reading system, in order to provide a high-quality image to a user without increasing the image data transfer time, a scanner performs a gamma correction process of the image data before transmitting the generated image data to a PC and reduces the number of tones of the image data. In the image reading system, in order to automatically determine the image characteristics (for example, an image color) and provide the image data having undergone the gamma correction process depending on the determination result to the user, the scanner needs to determine the characteristics of the read image before execution of the gamma correction process.

In the above image reading system, when the scanner executes a process for determining the image characteristics (for example, the above color determination process) in addition to the gamma correction process, processing units for executing the respective processes needs to be arranged in the scanner. This results in an increase in the manufacturing cost of the scanner. In order to prevent an increase in the manufacturing cost of the scanner, the processing to be executed by the scanner (that is, the image reading apparatus) needs to be reduced without degrading the quality of the output image in the image reading system.

SUMMARY OF THE INVENTION

The present invention has been made in consideration of the above problems, and provides a technique for improving the quality of an image by gamma correction while reducing the processing to be executed in an image reading apparatus in an image reading system.

According to an aspect of the present invention, there is provided an image reading system comprising an image reading apparatus and an information processing apparatus which is connectable to the image reading apparatus and acquires image data from the image reading apparatus, wherein the image reading apparatus comprises: a reading unit configured to read an image of an original to generate image data; a first correction unit configured to perform gamma correction of the image data generated by the reading unit, in accordance with a first correction characteristic; and a transmission unit configured to transmit the image data corrected by the first correction unit to the information processing apparatus, and the information processing apparatus comprises: a first determination unit configured to, upon reception of image data transmitted from the transmission unit, determine an image characteristic indicated by the received image data; a second determination unit configured to determine whether or not the image characteristic determined by the first determination unit corresponds to the first correction characteristic; and a second correction unit configured to, when the second determination unit determines that the image characteristic does not correspond to the first correction characteristic, perform gamma correction of the received image data in accordance with an inverse characteristic of the first correction characteristic and perform gamma correction of the received image data in accordance with a second correction characteristic corresponding to the image characteristic.

According to another aspect of the present invention, there is provided an image reading system comprising: a reading unit configured to read an image of an original to generate image data; a brightness setting unit configured to set brightness of an image to perform correction of the image data generated by the reading unit; a plurality of brightness correction units configured to perform brightness correction of the image data generated by the reading unit so as to set the brightness of the image to brightness set by the brightness setting unit; an image processing unit configured to perform image processing of the image data generated by the reading unit, based on a predetermined setting condition; and a control unit configured to control the plurality of brightness correction units based on at least one of the predetermined setting condition and the brightness setting.

According to still another aspect of the present invention, there is provided an image reading system comprising: a reading unit configured to read an image of an original to generate image data; a brightness setting unit configured to set brightness of an image to perform correction of the image data generated by the reading unit; a plurality of brightness correction units configured to perform brightness correction of the image data generated by the reading unit so as to set the brightness of the image to brightness set by the brightness setting unit; an image processing unit configured to perform image processing of the image data generated by the reading unit, based on a predetermined setting condition; and a control unit configured to control the plurality of brightness correction units based on at least one of the predetermined setting condition and the brightness setting.

According to yet another aspect of the present invention, there is provided a computer-readable storage medium storing a computer program for causing a computer to function as an information processing apparatus which is connectable to an image reading apparatus comprising: a reading unit configured to read an image of an original to generate image data; a first correction unit configured to perform gamma correction of the image data generated by the reading unit using a first correction characteristic; and a transmission unit configured to transmit image data corrected by the first correction unit to the information processing apparatus, the information processing apparatus acquiring image data from the image reading apparatus, and comprising: a first determination unit configured to, upon reception of image data transmitted from the transmission unit, determine an image characteristic indicated by the received image data, a second determination unit configured to determine whether or not the image characteristic determined by the first determination unit corresponds to the first correction characteristic, and a second correction unit configured to, when the second determination unit determines that the image characteristic does not correspond to the first correction characteristic, perform gamma correction of the received image data in accordance with an inverse characteristic of the first correction characteristic and perform gamma correction of the received image data in accordance with a second correction characteristic corresponding to the image characteristic.

According to the present invention, there is provided a technique for improving image quality by gamma correction while the processing to be executed by the image reading apparatus can be reduced in the image reading system.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the present invention.

FIG. 14 is a view showing an image reading unit and its vicinity according to the other embodiment of the present invention.

FIG. 24 is a view for explaining the correction process in which brightness settings are inversion of brightness according to the other embodiment of the present invention.

DESCRIPTION OF THE EMBODIMENTS

Figure 1A:
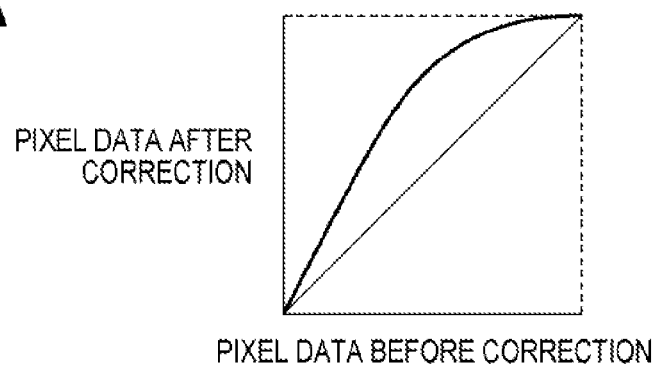
FIG. 1A is a graph showing a change in pixel data value when a gamma correction process is performed for each pixel data included in image data.

Embodiments of the present invention will be described with reference to the accompanying drawings. Note that the following embodiments will not limit the invention according to the appended claims and are not indispensable to the solving means of the inventions as combinations of all features described in the embodiments.
<Arrangement of Image Reading System>

As an example of an image reading apparatus and an information processing apparatus, this embodiment will be exemplified in which the present invention is applied to a scanner and a PC. In this embodiment, a system comprising a scanner and a PC connectable to the scanner will be assumed as an image reading system. In the image reading system of this embodiment, the scanner reads an image from an original to generate the corresponding image data. The PC acquires the image data from the scanner. Note that, in the image reading system, the scanner and PC may be connected via a serial interface or parallel interface or may be connected via a network such as a LAN using a wired or wireless connection.
<Arrangement of Image Reading Apparatus (Scanner)>

The overall arrangement of a scanner 200 according to an embodiment of the present invention will be described with reference to FIG. 2. The scanner 200 feeds originals from an original bundle D placed on a tray 210 one by one and conveys each original along a conveyance path. The scanner 200 includes pickup rollers 202, a paper feed roller 203, a separation roller 204, and conveyance rollers 208 arranged along the conveyance path as rollers for conveying an original. The scanner 200 also includes, along the conveyance path, a line image sensor 205 and a white plate 207 arranged at a position opposing the line image sensor 205 via the conveyance path.

In the scanner 200, the pickup rollers 202 pick up an original from the original bundle D placed on the tray 210. Note that the original bundle D placed on the tray 210 is detected by an original detection sensor 209. The original picked up from the tray 210 and separated one by one by the separation roller 204 is fed into an apparatus (conveyance path) by the paper feed roller 203. The original fed into the apparatus is finally conveyed along the conveyance path until a discharge port by the four conveyance rollers 208 shown in FIG. 2 and discharged outside the apparatus. The original fed to the conveyance path is conveyed by the conveyance rollers 208 and is detected by a registration sensor 206. The scanner 200 conveys the original and reads an image using the line image sensor 205 with reference to an original detection timing of the registration sensor 206.

The line image sensor 205 reads an image formed on the upper surface of the conveyed original and outputs a signal corresponding to the image. Before the scanner 200 starts the reading of the image, the line image sensor 205 reads the white plate 207 to generate correction data used for shading correction. The correction data is generated for each pixel along the main scanning direction (a direction perpendicular to the convey direction of the original) of the line image sensor 205 and stored in a memory or the like.

After the original is detected by the registration sensor 206, the original is conveyed along the conveyance path. During this convey operation, the image on the upper surface of the original is read by the line image sensor 205. The line image sensor 205 reads the image formed on the upper surface of the original along the main scanning direction, and outputs a signal corresponding to the read image. Note that the output signal has undergone shading correction using the above correction data. After the image is read, the original is discharged outside the apparatus.

Figure 2:
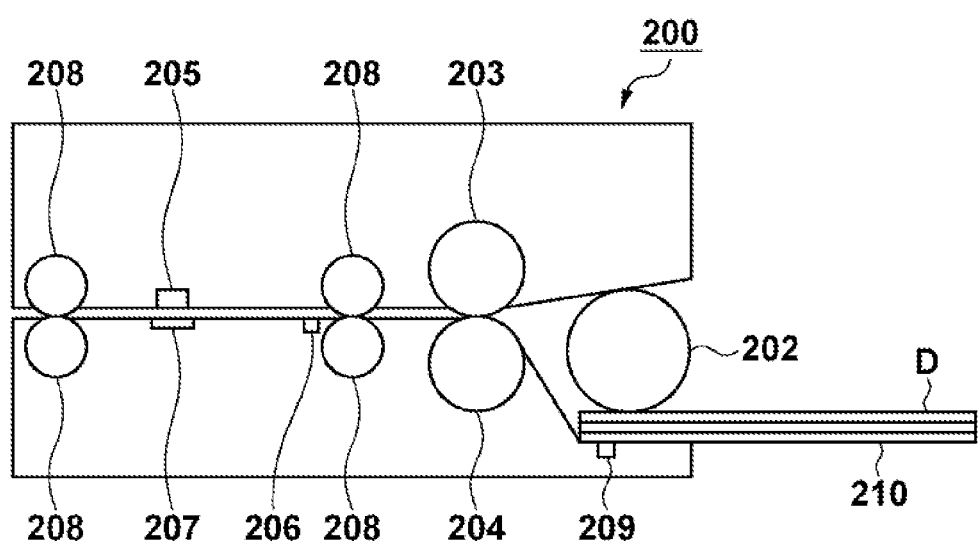
FIG. 2 is a sectional view of a scanner 200 according to an embodiment of the present invention.

FIG. 2 shows the scanner 200 of a sheet feed type as an example of the image reading apparatus according to the present invention. However, for example, a flatbed type scanner may alternatively be used as the image reading apparatus.

Figure 3:
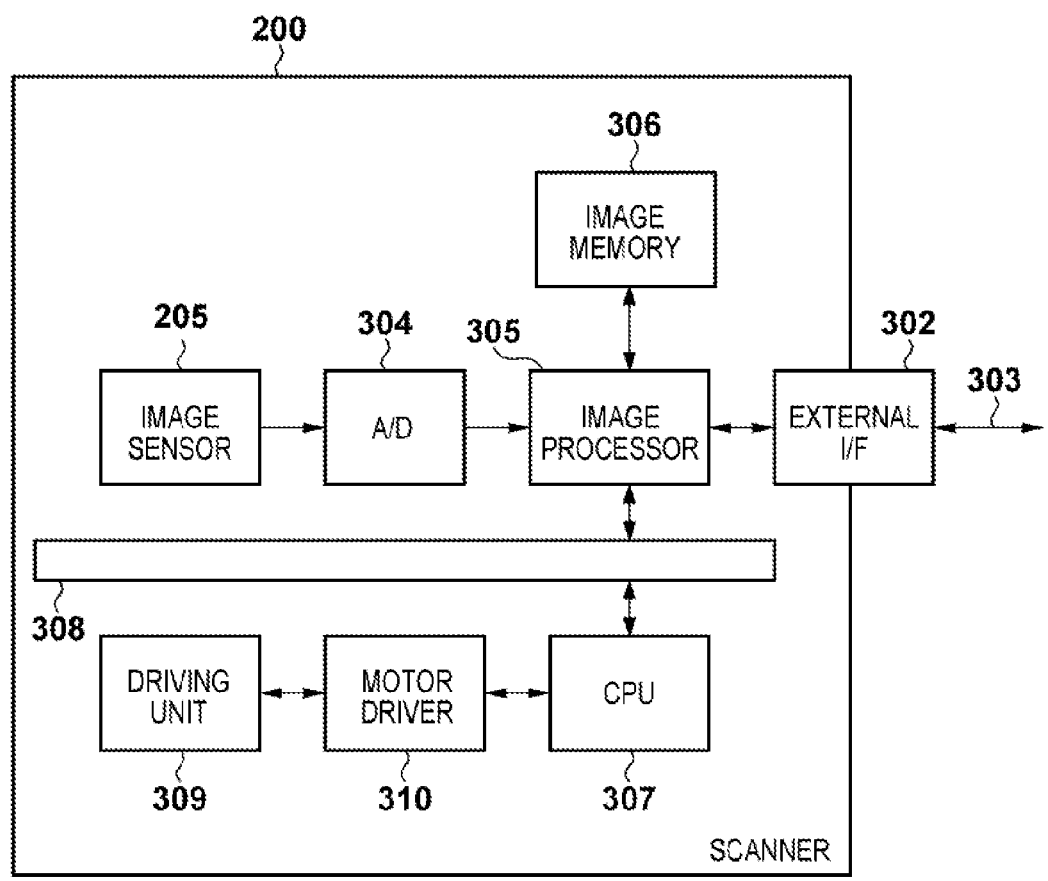
FIG. 3 is a block diagram showing an arrangement example of the scanner 200 according to the embodiment of the present invention.

The circuit arrangement of the scanner 200 will then be described with reference to FIG. 3. The schematic arrangement of a circuit for performing image processing for the signal output from the line image sensor 205 will particularly be illustrated in FIG. 3. The scanner 200 is connected to an external apparatus such as a PC via an external interface (I/F) 302 and a signal cable 303. The signal output from the line image sensor 205 upon image reading as described above is input to an A/D converter 304. The A/D converter 304 performs analog signal processes of amplification and black level clamping for the output signal from the line image sensor 205 and converts the resultant signal into digital signal quantized by a predetermined number of bits. The A/D converter 304 generates image data corresponding to the original image. The image data output from the A/D converter 304 is input to an image processor 305.

The image processor 305 performs control of the line image sensor 205, the A/D converter 304, and the like and various types of image processing (shading correction, gamma correction, and the like) for the image data output from the A/D converter 304. An image memory 306 is a memory device which temporarily stores image data input to the image processor 305. The image memory 306 may stores correction data for shading correction described above. A CPU 307 corresponds to the controller for controlling the overall scanner. The image processor 305 and the CPU 307 are connected via a bus 308. The CPU 307 can access the image memory 306 via the image processor 305. A driving unit 309 is a motor for driving a roller for conveying the original and the like. The driving unit 309 is driven by a motor driver 310 in accordance with an instruction from the CPU 307.

<Arrangement of Information Processing Apparatus (PC)>

Figure 4:
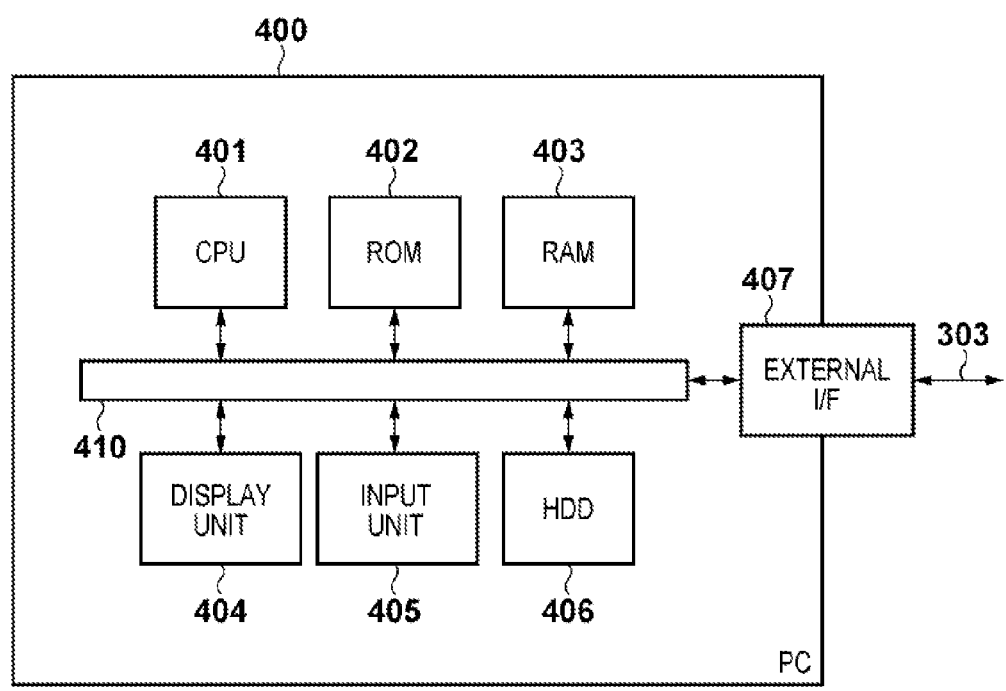
FIG. 4 is a block diagram showing an arrangement example of a PC 400 according to the embodiment of the present invention.

The arrangement of a PC 400 according to an embodiment of the present invention will be described with reference to FIG. 4. In the PC 400, a CPU 401, ROM 402, RAM 403, display unit 404, input unit 405, HDD 406, and external I/F are connected to a bus 410. The above components can exchange information via the bus 410. The CPU 401 controls the overall PC 400. The CPU 401 reads out a control program stored in the ROM 402, loads it into the RAM 403, and executes it, thereby executing various control operations. The RAM 403 is used as a main memory of the CPU 401 and a temporary memory area such as a work area. The HDD 406 stores image data and various types of programs including application software (application) to be described later. The display unit 404 includes a display for displaying, for example, an operation screen in accordance with the application. The input unit 405 includes various kinds of input devices such as a keyboard, a mouse or a touch panel arranged on the display of the display unit 404.

The external I/F 407 is an interface for connecting the PC 400 and an external apparatus. In this embodiment, the scanner 200 is connected to the external I/F 407 via the signal cable 303. As the interface between the PC 400 and the scanner 200, any interface such as USB, SCSI, or Bluetooth® is used regardless of the wired or wireless interface. In this embodiment, as an example, it is assumed that the SCSI interface is used as an interface, and a cable corresponding to the SCSI is used as the signal cable 303.

Figure 5:
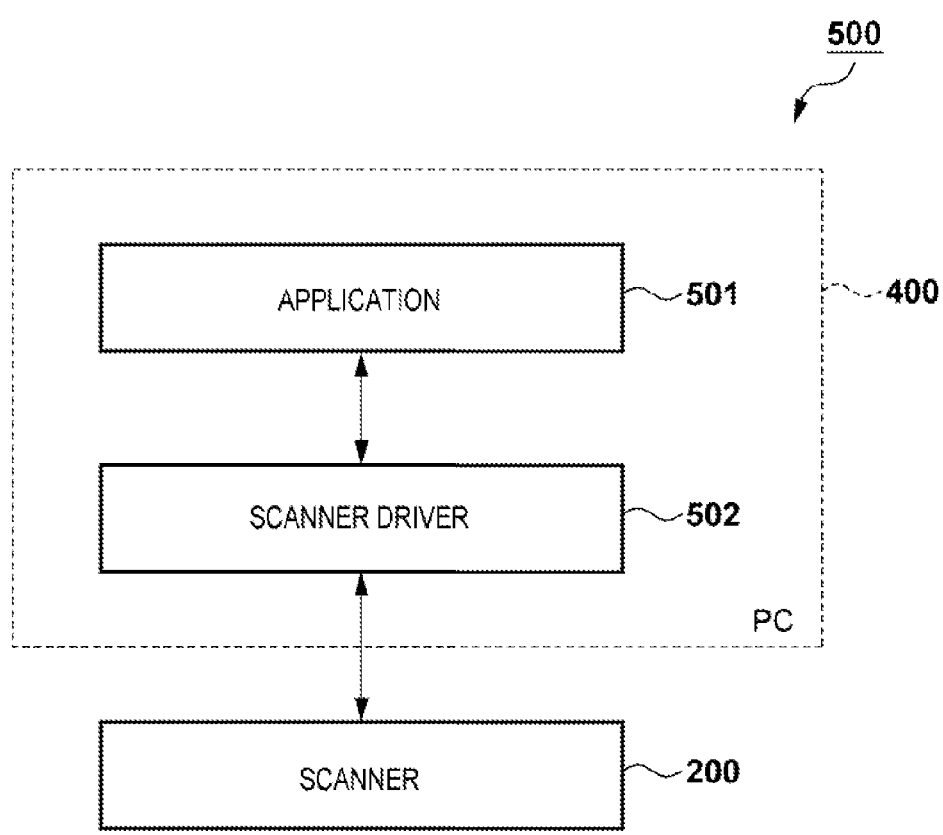
FIG. 5 is a block diagram showing a software configuration in an image reading system 500 including the PC 400 and the scanner 200 according to the embodiment of the present invention.

The software configuration of an image reading system 500 including the PC 400 and the scanner 200 will be described with reference to FIG. 5. An application software (application 501) for displaying an image and storing image data based on the image data on the PC 400 and a scanner control software (scanner driver 502) for controlling the scanner 200 from the PC 400 are installed in the PC 400 by the user in advance. The installed application 501 and scanner driver 502 are stored in the HDD 406 or the like. The CPU 401 reads out these software applications stored in the HDD 406 or the like to the RAM 403 and executes them, thereby implementing, on the PC 400, the functions of these software applications (to be described later).

The application 501 communicates with the scanner driver 502 using a predetermined protocol. In this embodiment, the application 501 and the scanner driver 502 are assumed to communicate with each other based on a predetermined protocol defined by the Twain standard. Note that a protocol determined by the ISIS or WIA standard other than the Twain standard may be used as the protocol described above. Alternatively, the scanner driver 502 and the scanner 200 communicate with each other based on the SCSI as described above.

The application 501 activated in the PC 400 communicates with the scanner 200 via the scanner driver 502. For example, the application 501 transmits an image reading instruction to the scanner 200 via the scanner driver 502 in accordance with the user instruction input via the input unit 405. The application 501 receives image data generated by the reading processing from the scanner 200 via the scanner driver 502. The scanner driver 502 can apply, to the image data received from the scanner 200, various types of image processing such as processing for determining image characteristics (for example, a color and brightness) and gamma correction. The scanner driver 502 transmits the image data after the image processing to the application 501. The application 501, for example, displays (outputs) the image data received from the scanner driver 502 on the display unit 404 or stores the received image data in the HDD 406.

<Designation of Reading Settings>

The user can designate various types of reading settings via the user interface (setting screen) displayed on the display unit 404 by the scanner driver 502 when causing the scanner 200 to execute the image reading by using the scanner driver 502 in the PC 400. The user operates the input unit 405 to manipulate the user interface displayed on the display unit 404, thereby inputting reading settings.

Figure 6:
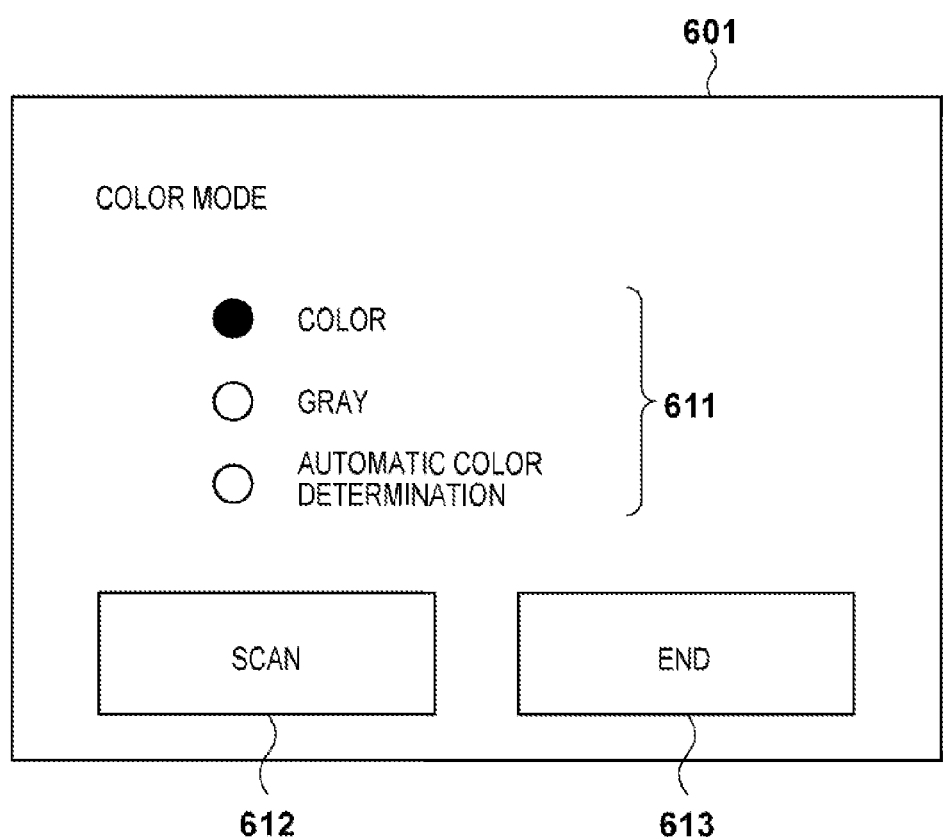
FIG. 6 is a view showing an example of a user interface for designating a color mode.

For example, the scanner driver 502 on the PC 400 displays, on the display unit 404, a user interface on which a color mode for reading an image by the scanner 200 can be set. FIG. 6 shows an example (601) of a user interface displayed on the display unit 404 by the scanner driver 502 in the PC 400. The user interface 601 includes a check box 611 by which the user can select the color mode, a button 612 for designating the start of execution of the reading process, and a button 613 for designating the end of color mode setting. Using the input unit 405, the user operates the check box 611 and the buttons 612 and 613 of the user interface 601 displayed on the display unit 404 to input the reading settings.

In this embodiment, by selecting one of the three items included in the check box 611 of the user interface 601, one of the three color modes can be designated as a color mode for reading operation by the scanner 200. As one of the three color modes, one of the multicolor mode ("color"), monocolor mode ("gray"), and automatic determination mode ("automatic color determination") can be selected. The multicolor mode is a mode for generating image data of a multicolor image. The monocolor mode is a mode for generating image data of a monocolor. The automatic determination mode is a mode for automatically determining the color of an image read by the scanner 200 (line image sensor 205) and generating image data depending on the determination result. When the user presses the button 612, the color mode set using the user interface 601 is notified to the scanner 200.

Note that the image reading settings may be performed by not only designation on the PC 400 but also designation via the input device such as the touch panel arranged on the scanner 200. The reading settings may include not only the color mode but also settings associated with an image reading resolution, a reading area and the like. In this case, the PC 400 may be designed to display, on the display unit 404, a user interface capable of designating such reading settings upon operating the input unit 405.

The monocolor mode of the above three color modes is a mode for generating image data of, for example, a black monocolor image (that is, a monochrome image). In this case, the monocolor image corresponds to a gray image having a predetermined number of tones. Note that as the color mode, for example, a mode for generating image data of a monochrome binary image may be enabled to be designated in addition to the multicolor image and the monocolor image.

<Reading Process of Image>

When the scanner 200 receives the above reading settings and a reading start instruction (reading start command) from the PC 400, the scanner 200 starts reading an image in accordance with the received reading settings (color mode). In this embodiment, the image processor 305 of the scanner 200 switches and uses a correction characteristic (first correction characteristic) used for gamma correction in accordance with the color mode designated as the reading condition.

When the multicolor mode or monocolor mode is designated as the color mode, the image processor 305 performs gamma correction of the image data generated by the image reading in accordance with the correction characteristic corresponding to the designated color mode. More specifically, the image processor 305 performs gamma correction using the correction characteristic corresponding to the color image in the multicolor mode. The image processor 305 performs gamma correction using the characteristic corresponding to the monocolor image in the monocolor mode. When the automatic designation mode is designated as the color mode, the image processor 305 does not determine the color of the read image on the scanner 200 side and uniformly performs gamma correction using the correction characteristic corresponding to the multicolor image. In the following description, a case in which the multicolor mode or monocolor mode is designated as the color mode and a case in which the automatic determination mode is designated will be described with reference to FIGS. 7 and 8, respectively.

(Monocolor Mode)

Figure 7:
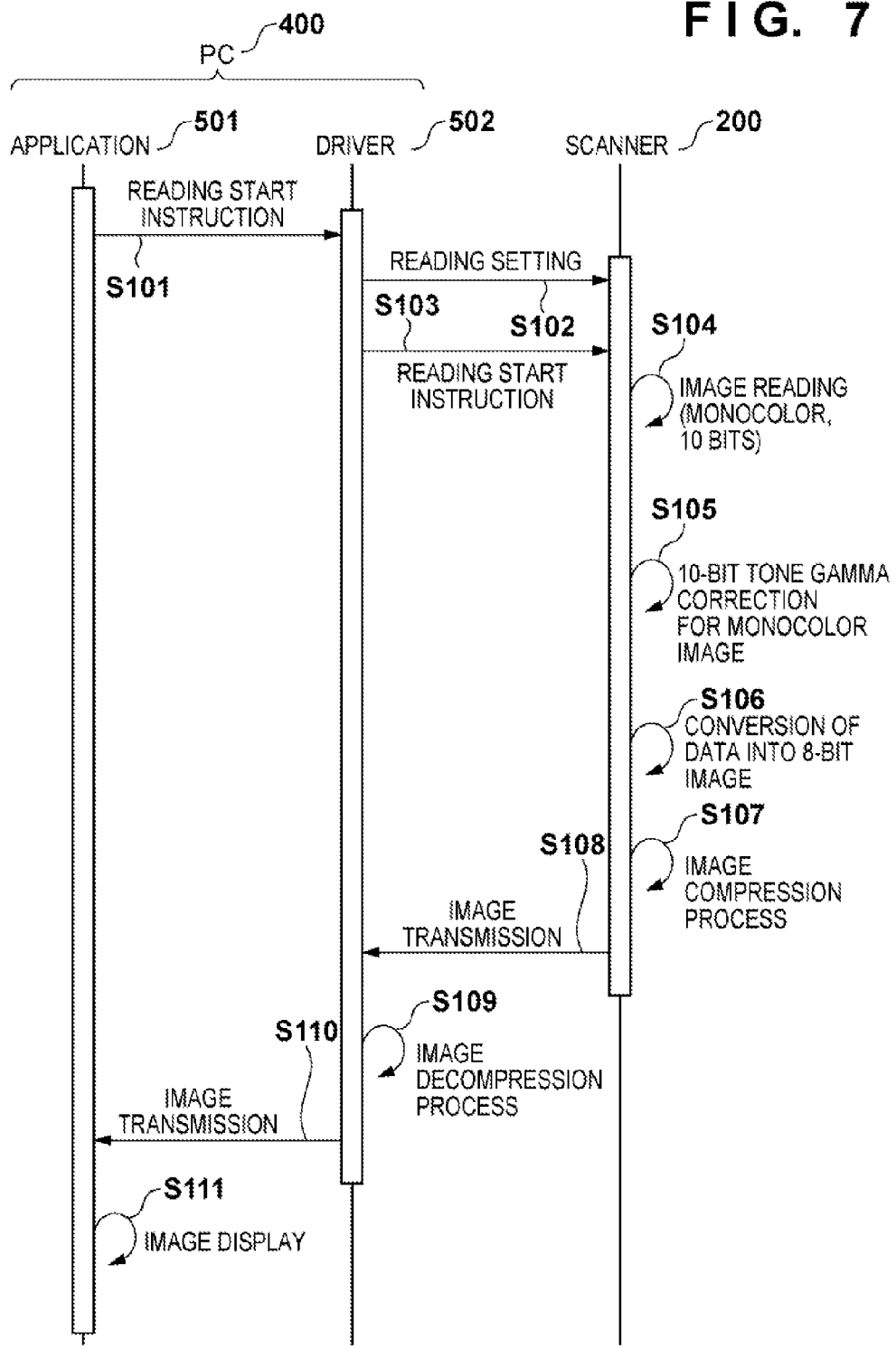
FIG. 7 is a flowchart showing the sequence of an image reading process in a monocolor mode in the image reading system 500 according to the embodiment of the present invention.

A sequence for the image reading process when the monocolor mode is designated as the color mode by the scanner driver 502 will be described with reference to FIG. 7. Note that even if the multicolor mode is designated, the same sequence except for the steps S104 and S105 is performed.

First of all, the user sets an original on the scanner 200 and causes the display unit 404 to display the user interface 601 by the scanner driver (to be simply referred to as a "driver" hereinafter) 502 via the application 501 on the PC 400. When the user designates the monocolor mode as the reading setting using the user interface 601 and presses the button 612, the application 501 transmits the image reading start instruction to the scanner driver 502 in step S101. Upon reception of the image reading start instruction, the scanner driver 502 transmits the designated reading setting to the scanner in step S102 and then transmits the image reading start instruction to the scanner 200 in step S103.

Upon reception of the image reading start instruction from the scanner driver 502 of the PC 400, in step S104, the scanner 200 starts conveying of the original and starts reading of the image formed on the upper surface of the original in accordance with the above transmitted reading setting. The line image sensor 205 and the A/D converter 304 of the scanner 200 read the image of the conveyed original and generate image data of the monocolor image expressed in the 10-bit tones (1,024 tones). Note that the number of bits corresponding to the number of tones is determined in the scanner 200 in advance. In this manner, according to this embodiment, the line image sensor 205 and the A/D converter 304 serve as a reading unit.

In step S105, the image processor 305 of the scanner 200 then performs the 10-bit tone gamma correction of the image data generated in step S104. In this case, gamma correction by the correction characteristic corresponding to the monocolor image is performed. The correction characteristic corresponds to the first correction characteristic. The image processor 305 functions as the first correction unit configured to perform gamma correction using the first correction characteristic.

In step S106, the image processor 305 converts the image data after the gamma correction into image data whose number of tones is reduced. In this case, the image processor 305 converts the image data from the 10-bit tone data into 8-bit tone data. In addition, in step S107, the image processor 305 performs compression processing such as JPEG compression for the converted image data. In this manner, by reducing the data amount of the image data, the transfer time for transferring the image data from the scanner 200 to the PC 400 can be shortened. Finally, in step S108, the scanner 200 transmits the converted and compressed image data to the scanner driver 502 of the PC 400 via the external I/O 302.

The scanner driver 502 of the PC 400 decompresses the received image data in step S109. In step S110, the scanner driver 502 transmits the decompressed image data to the application 501. The application 501 displays the image based on the received image data on the display unit 404, thereby outputting the image data. Note that the multicolor mode in place of the monocolor mode is designated as the color mode, multicolor image data is generated in step S104, and gamma correction using the correction characteristic corresponding to the multicolor image is performed in step S105.

(Automatic Determination Mode)

A sequence of the image reading process when the automatic determination mode is designated as the color mode by the scanner driver 502 will be described below. In the automatic determination mode, the color of the read image is automatically determined, and an appropriate gamma correction needs to be applied to the image data in accordance with the determination result. In the scanner 200, however, when the automatic color determination for determining the color of the image is performed before performing gamma correction to the generated image data, the manufacturing cost of the scanner 200 undesirably increases as described above. In view of this, the automatic color determination is not performed on the scanner 200 side but on the PC 400 side in the automatic determination mode of this embodiment.

In this embodiment, as in the monocolor mode and the multicolor mode, the following processing is performed in order to shorten the transfer time of image data from the scanner 200 to the PC 400 without degrading the quality of the image data of the read image even in the automatic determination mode. The scanner 200 performs the gamma correction of the image data using the predetermined correction characteristic (first correction characteristic), without determining the color of the read image. In this embodiment, as an example, the correction characteristic corresponding to the color image is used as the first correction characteristic.

On the other hand, the PC 400 performs the automatic color determination by determining the color as the characteristic indicated by the image data received from the scanner 200. In addition, the PC 400 determines whether or not the determined color (characteristic) of the image corresponds to the correction characteristic of the gamma correction applied on the scanner 200 side. If the color does not corresponds to the correction characteristic, the PC 400 performs the gamma correction of the image data again, based on the correction characteristic corresponding to the determined color of the image. In this manner, even if the automatic color determination is performed not by the scanner 200 but by the PC 400, the appropriate gamma correction corresponding to the determination result is applied to the image data. As a result, the quality of the image can be improved based on the read image data in accordance with the gamma correction while the processing executed by the scanner 200 can be reduced.

Figure 1B:
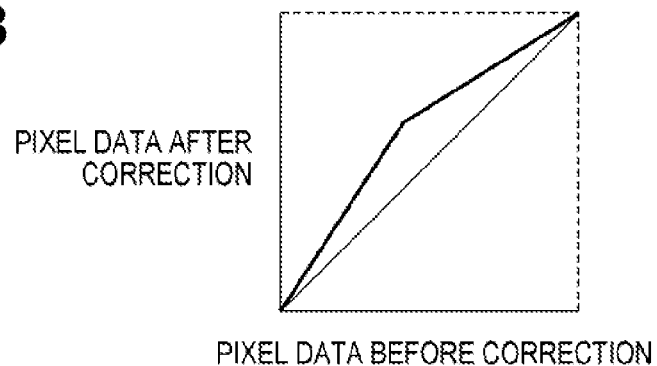
FIG. 1B is a graph showing a change in pixel data value when a gamma correction process is performed for each pixel data included in image data.
Figure 1C:
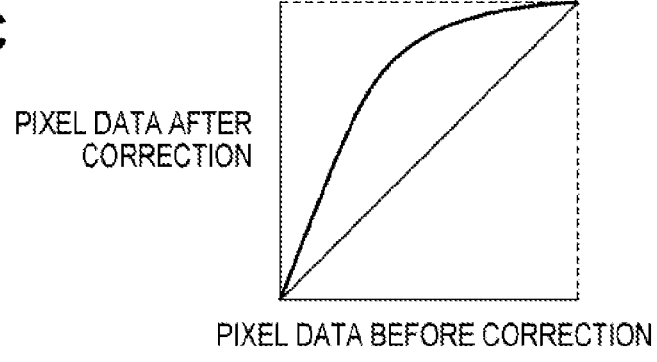
FIG. 1C is a graph showing a change in pixel data value when a gamma correction process is performed for each pixel data included in image data.

However, when gamma correction is performed a total of twice on the scanner 200 side and the PC 400 side, the image quality may be degraded. FIGS. 1A to 1C each show an example of a graph showing a change in pixel data value (RGB data value or brightness) when gamma correction processing is performed for each pixel data included in the image data. The ordinate represents the pixel data values before correction, and the abscissa represents the pixel data values after correction. FIGS. 1A and 1B show cases in which gamma correction of the image data not subjected to the gamma correction is performed using the correction characteristics respectively corresponding to the multicolor image and the monocolor image. FIG. 1C shows a case in which image data has undergone gamma correction twice by performing gamma correction using the correction characteristic corresponding to the monocolor image after gamma correction is performed using the correction characteristic corresponding to the multicolor image. In particular, when FIGS. 1B and 1C are compared with each other, when gamma correction corresponding to the monocolor image is performed, the corrected pixel data values change depending on whether (first) gamma correction has already been performed or not. Thus, when gamma correction is performed for one image data twice, the resultant image quality changes as compared with the case in which gamma correction is performed once. As a result, there is a possibility that desired image quality cannot be obtained.

In this embodiment, when an image color (characteristic) determined by the PC 400 does not correspond to a gamma correction characteristic applied in the scanner 200, gamma correction is to be applied to the image data twice. In this case, in order to avoid the desired image quality from being unable to be obtained as described above, the PC 400 performs the following process. The PC 400 performs gamma correction (that is, inverse gamma correction) having an inverse characteristic of the correction characteristic of the first gamma correction applied to the image data by the scanner 200, prior to the execution of second gamma correction corresponding to the determined image color (characteristic). This makes it possible to perform the second gamma correction of the image data after the image data is restored to the state before the application of the first gamma correction. As a result, as in the case in which the second gamma correction of the image data having not undergone gamma correction is performed in the PC 400, the gamma correction can improve the image quality.

Figure 8:
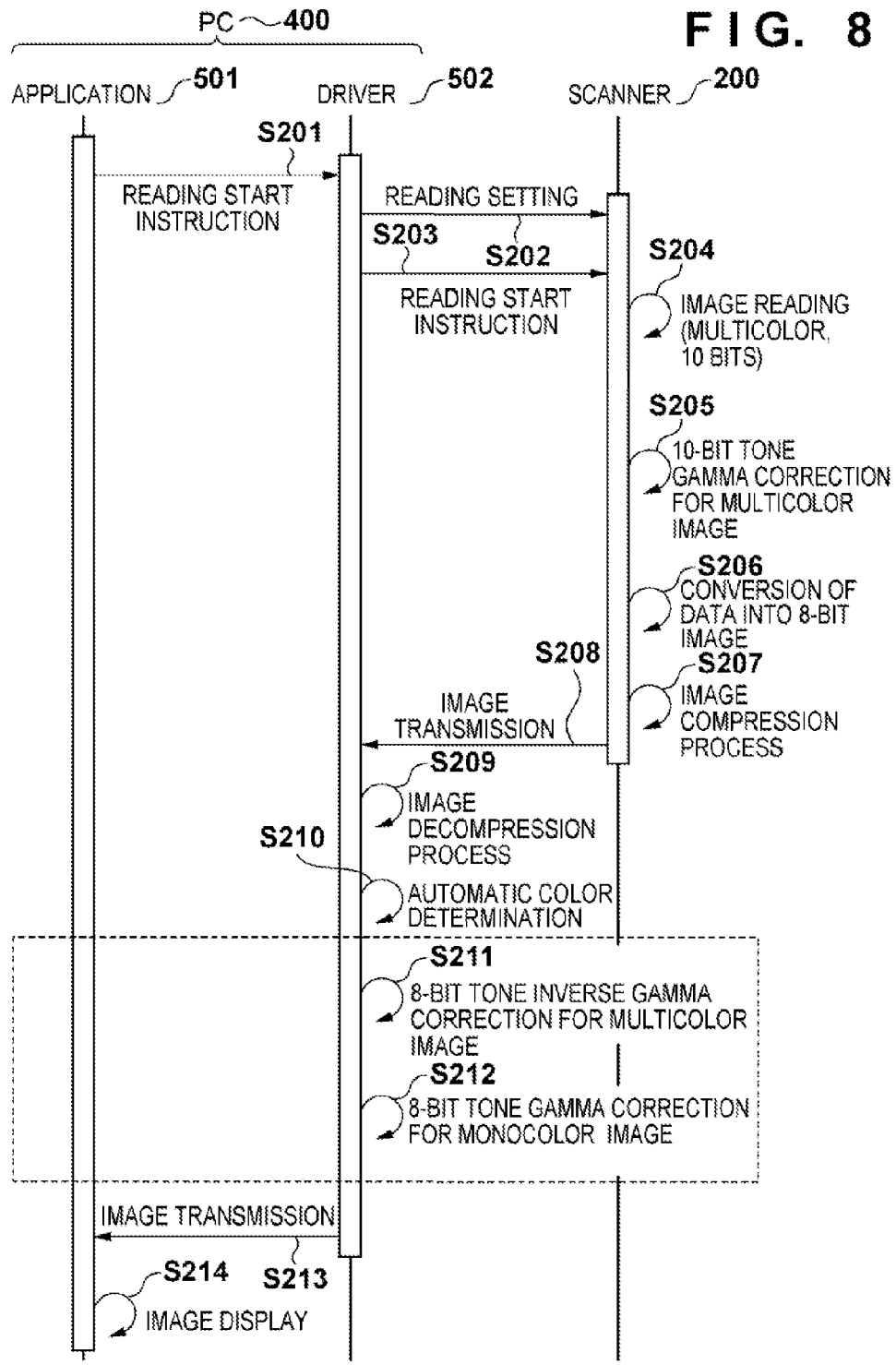
FIG. 8 is a flowchart showing the sequence of an image reading process in an automatic determination mode in the image reading system 500 according to the embodiment of the present invention.

An example of an image reading process sequence in the automatic determination mode will be described below with reference to FIG. 8. First of all, the user sets an original on the scanner 200 and causes the display unit 404 to display the user interface 601 by the scanner driver 502 via the application 501 on the PC 400. When the user designates the automatic determination mode as the reading setting using the user interface 601 and presses the button 612, the application 501 transmits the image reading start instruction to the scanner driver 502 in step S201. Upon reception of the image reading start instruction, the scanner driver 502 transmits the designated reading setting to the scanner 200 in step S202 and then transmits the image reading start instruction to the scanner 200 in step S203.

Upon reception of the image reading start instruction from the scanner driver 502 of the PC 400, in step S204, the scanner 200 starts conveying of the original and starts reading of the image formed on the upper surface of the original in accordance with the above transmitted reading setting. In this case, when the automatic determination mode is designated, the process corresponding to the multicolor image is determined to be executed in the scanner 200 in advance. In step S204, the line image sensor 205 and the A/D converter 304 of the scanner 200 read the image of the conveyed original and generate image data of a 10-bit tone (1,024 tones) multicolor image.

In step S205, the image processor 305 of the scanner 200 performs 10-bit tone gamma correction of the image data generated in step S204. In this case, the gamma correction using the correction characteristic (first correction characteristic) corresponding to the multicolor image is performed. In step S206, the image processor 305 converts the gamma-corrected image data into image data, the number of tones of which is reduced. In this case, the image processor 305 converts the image data from the 10-bit tone image to the 8-bit tone image. After that, in step S207, the image processor 305 performs compression processing such a JPEG process for the converted image data. Finally, in step S208, the scanner 200 transmits the converted and compressed image data to the scanner driver 502 of the PC 400 via the external I/F 302.

The scanner driver 502 of the PC 400 performs decompression processing for the received image data in step S209. In step S210, the scanner driver 502 then determines the image color as the image characteristic indicated by the decompressed image data, in accordance with the designation of the automatic determination mode. In this case, the automatic color determination is performed as follows. For example, first, the scanner driver 502 calculates the saturations of some or all pixels included in the received image data. In addition, the scanner driver 502 determines, based on the total number of pixels whose calculated saturations are equal to or higher than a predetermined threshold, whether the image based on the received image data is a multicolor image or monocolor image. That is, if the total number of pixels whose saturations are equal to or higher than the predetermined threshold is a predetermined amount or more, the scanner driver 502 determines that this image is the multicolor image. If the total number of pixels is less than the predetermined amount, the scanner driver 502 determines that this image is the monocolor image.

In step S210, the scanner driver 502 determines, in accordance with the determination result of the image color (characteristic) based on the received image data, whether or not the image color corresponds to the correction characteristic in the first gamma correction performed by the scanner 200. If the image color is determined to correspond to the first gamma correction, the scanner driver 502 advances the process to step S213 to transmit the received and decompressed image data to the application 501. On the other hand, when the image color is determined not to correspond to the first gamma correction, the scanner driver 502 performs processes in steps S211 and S212 surrounded by the broken line in FIG. 8. In steps S211 and S212, the scanner driver 502 performs the second gamma correction using the correction characteristic (second correction characteristic) corresponding to the image color for the received image data, as will be described later. Note that the scanner driver 502 (CPU 401) functions as the first and second determination units in step S210.

In step S211, the scanner driver 502 performs inverse gamma correction for the received 8-bit tone image data. In this case, scanner driver 502 applies, to each pixel of the image data, gamma correction based on the inverse characteristic of the correction characteristic (the first correction characteristic corresponding to the multicolor image) of the first gamma correction applied in the scanner 200. For example, when a gamma correction function of $\gamma=2.0$ is used in the first gamma correction, a gamma correction function of γ=0.5 given as the inverse function of the gamma correction function of γ=2.0 is used in step S211. This makes it possible to restore the received image data to the state before applying the first gamma correction. In step S211, the scanner driver 502 performs the second gamma correction of the received image data using the correction characteristic corresponding to the image color (characteristic) determined in step S210. As described above, when the automatic determination mode is designated for the determination process in step S210 and the gamma correction processes in steps S211 and S212, the scanner driver 502 executes the respective processes. Note that the scanner driver 502 (CPU 401) functions as the second correction unit in steps S211 and S212.

In step S213, the scanner driver 502 then transmits the image data having undergone the second gamma correction in step S211 to the application 501. In step S214, the application 501 displays the image based on the received image data on the display unit 404, thereby outputting this image data.

As described above, in the image reading system of this embodiment, in particular, when the automatic determination mode is designated as a color mode as an example of image reading setting, the scanner 200 does not determine the read image color, but applies the gamma correction to the image data of the read image using the first correction characteristic and transmits the obtained image data to the PC 400. The PC 400 determines the color of the image indicated by the received image data. When the determined color does not correspond to the first correction characteristic, the PC 400 performs gamma correction of the received image data using the inverse characteristic of the first correction characteristic and then performs gamma correction using the second correction characteristic corresponding to the determined color. In this manner, the process for automatically determining the color (characteristic) of the read image is performed not in the scanner 200 but in the PC 400. This makes it possible to reduce the processing executed in the scanner 200 and improve the image quality by applying the gamma correction corresponding to the color of the read image to the image data of this image. As a result, it will be possible to prevent the manufacturing cost of the scanner 200 from increasing.

In this image reading system, when transferring the image data of the read image from the scanner 200 to the PC 400, the number of tones of the image data may be reduced as in the above embodiment. This can shorten the image data transfer time and obtain the above advantages. Note that in this embodiment, before the image data is transferred from the scanner 200 to the PC 400, the number of bits corresponding to the number of tones of the image data is reduced from 10 to 8 in the scanner 200. However, an arbitrary number of bits (for example, 12 bits or 16 bits) may be used as the number of bits corresponding to the number of tones.

In the above embodiment, in the automatic determination mode, the scanner driver 502 of the PC 400 determines in step S210 the image color serving as one of the image characteristics from the image data generated in the reading process in the scanner 200. However, in the present invention, the image characteristic determined in this determination process is not limited to the image color, but may be, for example, image brightness. In this modification, in step S212, the scanner driver 502 performs gamma correction using the correction characteristic corresponding to the image brightness determined in step S210. Note that the first correction characteristic in the first gamma correction in step S205 and the first correction characteristic in the first gamma correction in step S212 are correction characteristics corresponding to different image brightness levels. In this case as well, the same advantage as in the above embodiment can be obtained.

The present invention can also be implemented by executing the following process. That is, software (program) for implementing the functions of the above embodiment is supplied to a system or apparatus via a network or various types of storage media, and the system or apparatus computer (or a CPU, MPU, or the like) reads out the program and executes it.

In the above embodiment, the correction process for determining pixel data of one pixel after correction based on the pixel data of one pixel before correction is used as the inverse gamma correction. However, the inverse gamma correction of the present invention may be a correction process for determining the pixel data of one pixel after correction based on the pixel data of a plurality of pixels before correction. That is, for example, in the inverse gamma correction of a given pixel (defined as a pixel A), the gamma correction of the pixel data of the pixel A and a pixel adjacent to the pixel A is performed using the inverse characteristic of the correction characteristic of the first gamma correction. An average value of the pixel data of the pixels obtained by the above process is calculated. The average value is given as the pixel data after the inverse gamma correction of the pixel A in the correction process.

The embodiment of the present invention has been described above. However, the present invention is also effective in an image processing system for performing image brightness correction such as gamma correction of the image data read from the sheet or in the image processing system (and the image reading system to which this image processing system is applied) in which image processing of the above image data is further performed. In the following description, another embodiment of the present invention which is applicable to image processing in addition to the image brightness correction in an apparatus such as a copying machine, scanner, facsimile apparatus, or printer will be described in detail with reference to specific examples.

An image processing system can generally execute various kinds of image processing of image data read from an original so as to allow the user to obtain a desired read image (see Japanese Patent Laid-Open No. 1-317075). However, when brightness correction such as gamma correction is applied to the read image, and the user sets an extreme brightness correction condition, subsequent image processing may not be appropriately performed.

For example, when original size detection is performed by detecting a boundary between an original region and a background region included in the brightness-corrected image data, and the brightness correction condition is set to be excessively high brightness level, the boundary between the original region and the background region cannot be discriminated. It may become impossible to perform original size detection with high accuracy. Note that although the original size detection is exemplified here, image processing except the original size detection may not be properly performed depending on the brightness correction conditions.

The present invention can also be implemented as the following aspect to perform appropriate image processing of the read image data in consideration of the above situation when brightness correction such as gamma correction of this read image data is performed.

More specifically, according to another aspect, there is provided an image processing system comprising: an image accepting unit configured to accept an image read from a sheet; a brightness setting unit configured to set brightness of the image; a plurality of brightness correction units configured to correct the brightness of the image; an image processing unit configured to perform image processing of the image based on a predetermined setting condition; and a control unit configured to control the plurality of brightness correction units based on at least one of a setting condition of the image processing and setting of the brightness.

According to the other aspect of the present invention, the image processing system may further comprise an image reading apparatus configured to read an image from a sheet and an information processing apparatus connected to the image reading apparatus and configured to control the image reading apparatus, the plurality of brightness correction units comprising at least one first brightness correction unit, arranged on a side of the image reading apparatus, configured to perform first brightness correction of an image read by the image reading apparatus, and at least one second brightness correction unit, arranged on a side of the information processing apparatus, configured to perform second brightness correction of the image received via the image accepting unit, wherein the second brightness correction unit may perform the second brightness correction of an image accepted by the image accepting unit and having undergone compression/decompression or image processing by the first brightness correction unit and n or the image processing unit.

According to the other aspect of the present invention, the control unit may control to perform brightness correction of the image accepted by the image accepting unit by using, out of the plurality of brightness correction units, at least one brightness correction unit selected based on at least one of the setting condition of the image processing and the setting of the brightness.

In the other aspect of the present invention, the control unit may adjust correction ratios of the plurality of brightness correction processing units based on at least one of the setting of the image processing and the setting of the brightness.

In the other aspect of the present invention, the image processing system may further comprise an image processing enable/disable determination unit configured to determine, based on the correction ratios of the plurality of brightness correction units, whether or not image processing by the image processing unit can be performed.

In the other aspect of the present invention, the control unit may readjust the correction ratios of the plurality of brightness correction units based on a result obtained by the image processing enable/disable determination unit.

According to another aspect of the present invention, there is also provided an image processing system comprising: a first brightness correction unit configured to perform first brightness correction of image data read from a sheet; a second brightness correction unit configured to perform second brightness correction of the image data read from the sheet; a brightness correction condition setting unit configured to be capable of setting the first brightness condition for a brightness correction process by the first brightness correction unit and a second brightness condition for a brightness correction process by the second brightness correction unit; and an image processing unit configured to perform image processing of the image data read from the sheet, wherein when the brightness correction condition setting unit sets the first brightness condition, the image processing is performed after the first brightness correction unit performs the first brightness correction of the image data, and when the second brightness condition is set by the brightness correction condition setting unit, the image processing is performed and then the second brightness correction unit performs the second brightness correction of the image data.

According to the still another aspect of the present invention, there is provided an image processing system including an image reading apparatus configured to read an image from a sheet and an information processing apparatus configured to control the image reading apparatus, comprising: a first brightness correction unit, arranged in the image reading apparatus, configured to perform first brightness correction of the image data read from the sheet; a second brightness correction unit, arranged in the information processing apparatus, configured to perform second brightness correction of the image data received from the image reading apparatus; a brightness correction condition setting unit configured to be capable of setting a first brightness condition for a brightness correction process by the first brightness correction unit or a second brightness condition for a brightness correction process by the second brightness correction unit; and an image processing unit configured to perform image processing of the image data read from the sheet, wherein when the first brightness condition is set by the brightness correction condition setting unit, the image processing is performed after the first brightness correction unit performs the first brightness correction of the image data, and when the second brightness condition is set by the brightness correction condition setting unit, the image processing is performed and then the second brightness correction unit performs the second brightness correction of the image data.

According to the still other aspect of the present invention, the brightness correction process of the image data may be a process for uniformly increasing/decreasing values of RGB components of the image data, thereby adjusting the brightness.

According to the still other aspect of the present invention, the image processing of the image data may be a process for detecting an existence region or an outer shape of the sheet based on a boundary between a sheet region and a background region thereof included in the image data.

According to the still other aspect of the present invention, the image processing of the image data may be a process for detecting an inclination of the sheet based on a boundary between a sheet region and a background region thereof included in the image data.

According to the still other aspect of the present invention, the image processing may include at least one of a character recognition process, an image abnormality detection process, a color misregistration determination process, a color determination process, and a barcode detection process, or a combination of these processes.

According to the still other aspect of the present invention, the image processing system may further comprise: a brightness correction request accepting unit configured to accept a brightness correction request from a user; an image preprocess determination unit configured to determine in advance based on the brightness correction request, whether or not the image processing by the image processing mean is enabled; and a control unit configured to control a subsequent order of the brightness correction process and the image processing based on the determination result of the image preprocess determination unit.

According to the still other aspect of the present invention, the brightness correction condition setting unit may set the brightness correction condition by setting the brightness correction request from the user as the first brightness condition or the second brightness condition based on a determination result by the image preprocess determination unit.

According to the still other aspect of the present invention, the image processing system may further comprise third brightness correction unit configured to perform brightness correction using different correction conditions before and after the image processing.

According to another aspect of the present invention, there is provided an image brightness correction processing method wherein when correcting brightness of an image read from a sheet by at least one brightness correction unit of a plurality of brightness correction units upon accepting the image, an order of the plurality of brightness correction units and the image processing is controlled based on at least one of a setting condition of the image processing of the image and setting of brightness.

According to another aspect of the present invention, there is provided an image processing method wherein when predetermined image processing and brightness correction processing based on a first brightness condition or a second brightness condition is performed for image data read from a sheet, the image processing of the image data is performed after brightness correction based on the first condition if a condition is the first brightness condition, and brightness correction based on the second brightness condition is performed after the image processing of the image data is performed if the condition is the second brightness condition.

According to another aspect of the present invention, there is provided an image processing program wherein when a computer executes, for image data read from a sheet, predetermined image processing and brightness correction processing based on a first brightness condition or a second brightness condition, the computer performs the image processing of the image data after brightness correction based on the first condition if a condition is the first brightness condition, and the computer performs brightness correction based on the second brightness condition after the image processing of the image data is performed when the condition is the second brightness condition.

According to other aspects and further aspects of the present invention, for example, when the user arbitrarily changes the brightness correction condition, image processing settings, and the like for the image data, appropriate image processing can be performed for the read image data to obtain desired image data.

Another embodiment of the present invention will be described in detail with reference to FIGS. 9 to 24 in order to practice other aspects and further aspects of the present invention. Note that the sizes, materials, shapes, relative layouts, and the like described in this embodiment do not limit the scope of the present invention, unless otherwise specified.

Another Embodiment

Figure 9:
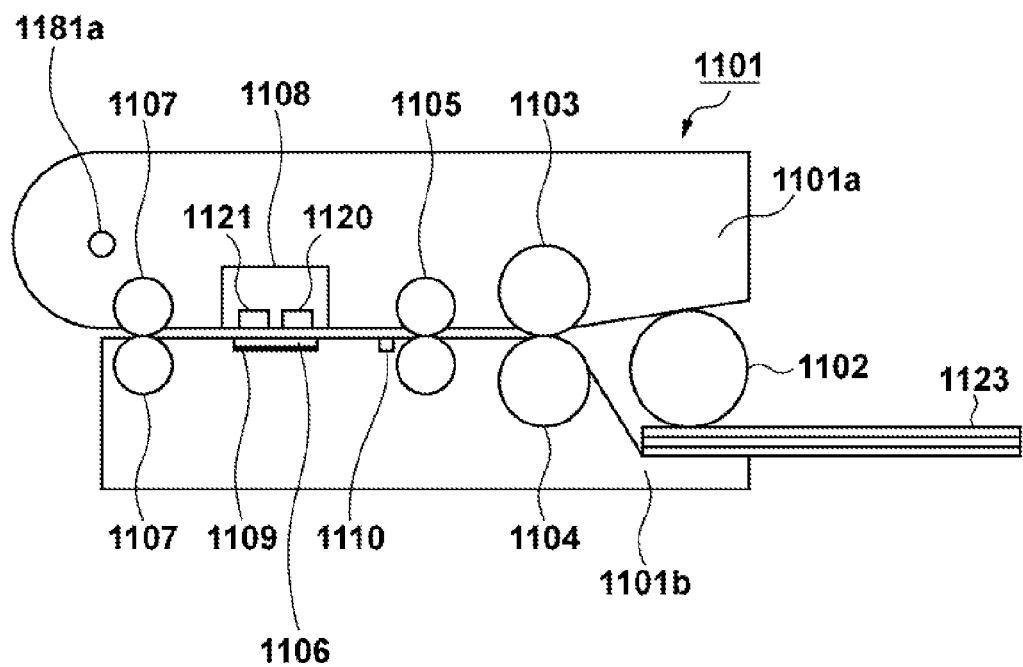
FIG. 9 is a sectional view showing an arrangement of a scanner in an image processing system according to another embodiment of the present invention.

FIG. 9 is a sectional view showing the arrangement of an image reading apparatus applicable to an image processing system according to another embodiment of the present invention.

An image reading apparatus (to be referred to as a scanner 1101) is a sheet feed scanner. The scanner 1101 includes pickup rollers 1102 for picking up an original from the upper surface side of an original bundle D, a paper feed roller 1103 for feeding the original picked up by the pickup rollers 1102 into the apparatus, a separation roller 1104 for separating the originals one by one, a reading unit 1108 for reading image information on the upper surface of the original separated from the original bundle D, a registration roller pair 1105 disposed upstream of the image unit 1108 so as to convey the original, a convey roller pair 1107 disposed downstream of the reading unit 1108 so as to convey the original, and a registration sensor 1110 arranged near the downstream side of the registration roller pair 1105 so as to detect the conveyed original.

The reading unit 1108 is fixed to an upper frame 1101a of the scanner 1101. The reading unit 1108 includes a line image sensor 1120 for reading an image of the original or an opposing member (to be described later), and a light source 1121 for irradiating the conveyed original or the like with light.

An opposing member (white member) 1109 serving as a color reference member disposed at a position opposing the reading unit 1108 and a glass plate 1106 disposed between the opposing member 1109 and the reading unit 1108 are disposed in a lower frame 1101b of the scanner 1101.

An operation for causing the scanner 1101 to read an image formed on an original will be described next. Upon reception of an image reading instruction, the scanner 1101 starts reading the image. First of all, when the scanner 1101 receives the image reading instruction, the line image sensor 1120 reads the white opposing member 1109 to generate correction data for correcting the sensitivity unevenness of the line image sensor 1120 and the light amount unevenness of the illumination (the correction of the sensitivity unevenness and the light amount unevenness will be referred to as shading correction hereinafter).

The generated correction data is stored for each pixel. After that, as described above, the original is fed from the upper surface side of the original bundle D into the scanner 1101 by the pickup rollers 1102 and the paper feed roller 1103. In this case, the originals are separated one by one by the separation roller 1104.

The separated original is conveyed in the subscanning direction (original convey direction) of the line image sensor 1120 located on the downstream side while the original is clamped by the registration roller pair 1105 and the convey roller pair 1107. During this conveyance, the reading unit 1108 reads the image formed on the upper surface (obverse surface) along the main scanning direction (a direction perpendicular to the original convey direction). In this embodiment, the scanner 1101 which reads an image on a single-side original is exemplified, but the embodiment is not limited to this. A scanner may read images of a double-side original.

The image data generated from an output signal of the line image sensor 1120 is subjected to shading correction with reference to the correction data described above. After image reading, the original is conveyed while being clamped by the convey roller pair 1107 and discharged outside the apparatus.

Figure 10:
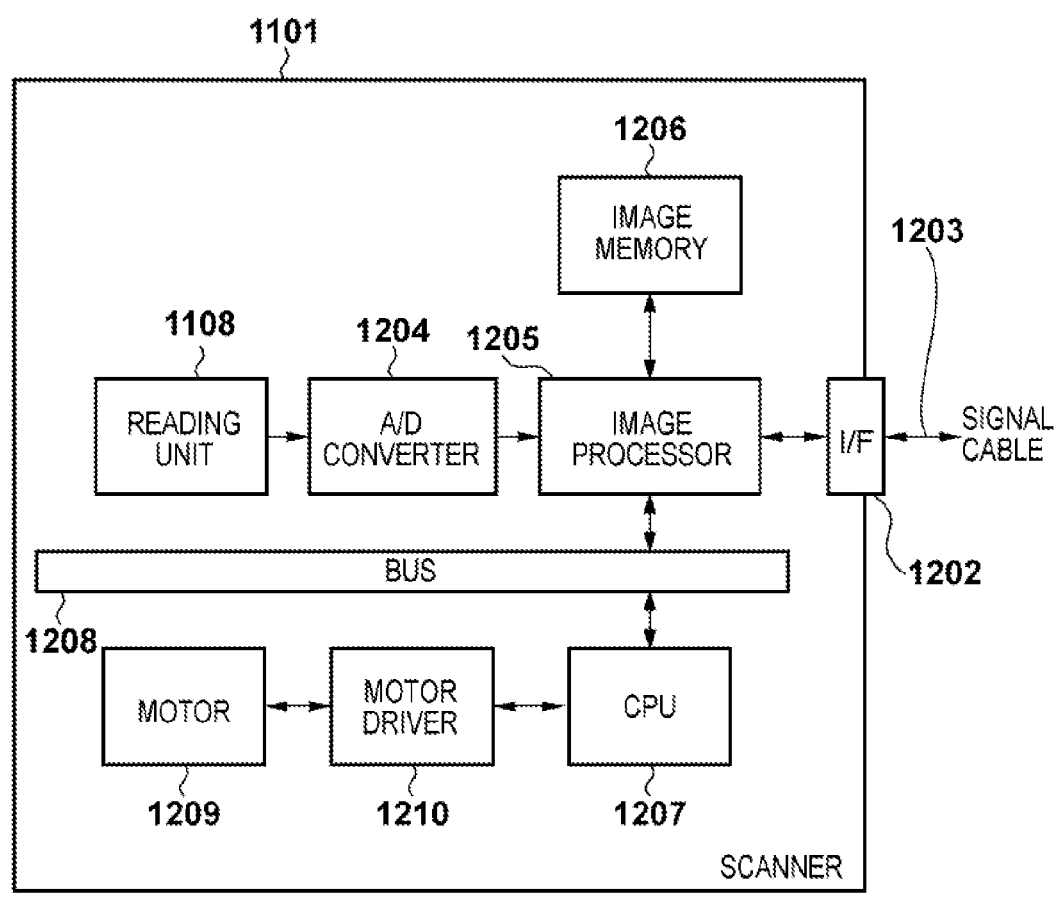
FIG. 10 is a block diagram showing the electrical arrangement of the scanner in the image processing system of the other embodiment of the present invention.

FIG. 10 is a block diagram showing the arrangement of the electrical circuit of the scanner 1101.

First of all, the image data is transferred from the reading unit 1108 to an A/D converter 1204. The A/D converter 1204 performs analog processes such as amplification and black level clamping of the received image data and converts the resultant image data into digital data. The A/D converter 1204 then transfers the digital data to an image processor 1205.

The image processor 1205 performs control of the line image sensor 1120 and the A/D converter 1204 and various image processing (for example, shading correction) of image data generated by digitizing the output signal from the line image sensor 1120. As the process for converting the output signal into the digital data, for example, 10-bit depth (1,024 tones, that is, the first tone mode) image data or 8-bit depth (256 tones, that is, the second tone mode) is generated in accordance with an instruction from the image processor 1205.

Note that the image processor 1205 is connected to an image memory 1206 which stores the generated image data and a CPU 1207 which serves as a controller for controlling the image reading apparatus. The image processor 1205 and the CPU 1207 are connected via a bus 1208. Therefore, the CPU 1207 is configured to be enabled to access the image memory 1206 via the image processor 1205.

A driving unit (for example, a motor) 1209 for conveying the original is operated by a motor driver 1210 which receives an instruction from the CPU 1207.

The image processor 1205 described above is also connected to an interface 1202. The image data having undergone the image processing is transferred to an external host apparatus which is an information processing apparatus such as a personal computer connected to the image reading unit 1108 via a signal cable 1203.

Figure 11:
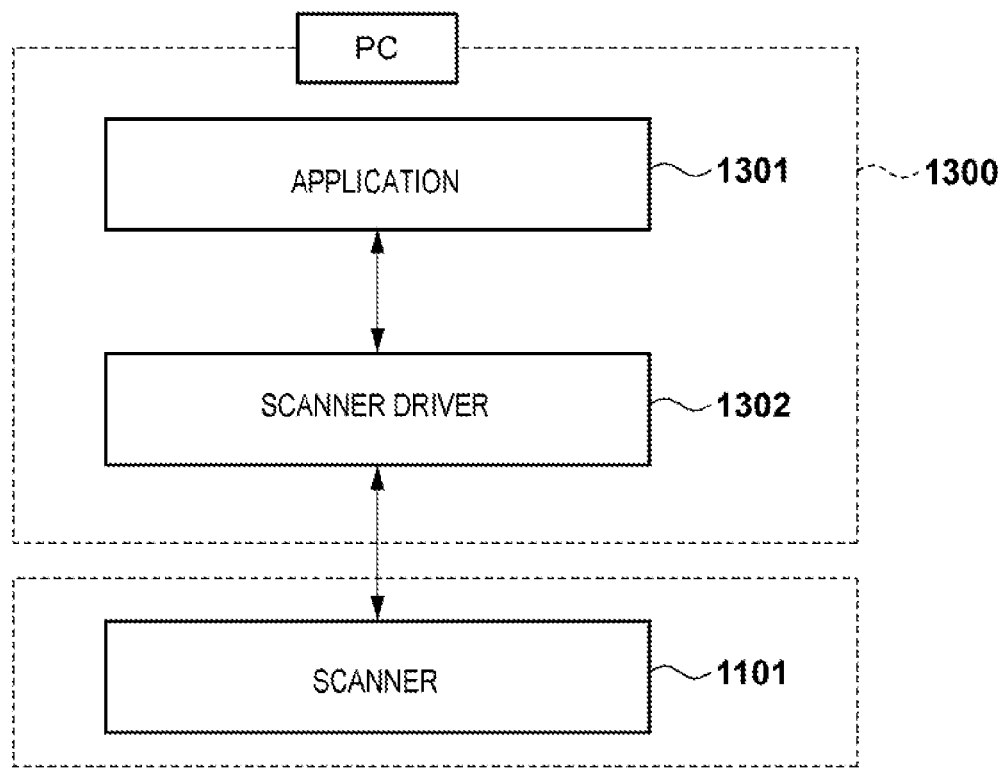
FIG. 11 is a block diagram showing the arrangement of an application, scanner driver, and scanner according to the other embodiment of the present invention.

FIG. 11 shows the schematic software configuration (information transmission path) of the image processing system according to the other embodiment of the present invention. More specifically, FIG. 11 shows the arrangement of the application, scanner driver, and scanner on a PC 1300. In FIG. 11, an application 1301 and a scanner driver 1302 are explained as separate software configurations. However, the application and scanner driver can be functionally implemented as one software configuration in which the application and scanner drivers are functionally integrated with each other, or as a dedicated application.

To control the scanner 1101 described above, the user installs the application 1301 and scanner driver 1302 in the PC in advance. The installed application 1301 communicates with the scanner 1101 via the scanner driver 1302. Using predetermined protocols, the application 1301 communicates with the scanner driver 1302 and the scanner driver 1302 communicates with the scanner 1101. In this embodiment, the application 1301 and the scanner driver 1302 communicate with each other using a protocol complying with the TWAIN standard. The scanner driver 1302 and the scanner 1101 communicate with each other using a protocol complying with the SCSI standard. However, the protocols are not limited to these. For example, the communication standard between the application 1301 and the scanner driver 1302 may be ISIS or WIA. The communication standard between the scanner driver 1302 and the scanner 1101 may be USB or IEEE802. In this manner, the scanner 1101 is connected to the PC 1300 to implement the image reading system of this embodiment.

When transferring image data from the scanner 1101 to the PC 1300, the image transfer time between the scanner 1101 and the scanner driver 1302 becomes shorter when the data transfer amount is smaller. 8 bits are used as the bit depth of the image transferred between the scanner 1101 and the scanner driver 1302 based on the transfer time and the image quality (in a color image, each of the R, G, and B pieces of brightness information uses 8 bits, and in a gray image, brightness information uses 8 bits). In the scanner driver 1302, the boundary of the original is detected from the received image data, and original size detection for calculating the width, length, and inclination of the original from the image data is performed. In the scanner 1101, the original size detection is not performed to prevent the cost from being high. That is, the original size detection is not performed in the scanner 1101, but in the scanner driver 1302. After that, the scanner driver 1302 transfers the image data to the application 1301, and the application 1301 displays and stores the received image data.

The system constituted by the above scanner 1101 and PC 1300 can perform the brightness correction process such as the gamma correction described in the above embodiment for each pixel of the read image in order to provide an image having brightness desired by the user. In this brightness correction process, the deeper the bit of the image as a processing target is, the higher the image quality is because the processing result keeps high tonality. The scanned image is obtained by the scanner as image data having a larger number of tones than that of the image data output from the scanner (for example, the bit depth is increased from 10 bits to 16 bits). After that, the data is converted into 8-bit (256 tones) data and transferred to the PC 1300. When the brightness correction process is performed in the scanner 1101, the brightness correction process using the image data having a larger number of tones is possible. This makes it possible to maintain higher tonality and obtain a high-quality image. When the brightness correction process is performed in the PC 1300, the transferred data is converted into the 8-bit data. In this case, the tonality of the transferred data is low, and a high-quality image may not be obtained.

For this reason, the brightness correction process may be performed in the scanner 1101 in order to provide a high-quality image to the user without increasing the image transfer time between the scanner 1101 and the scanner driver 1302. Assume that the brightness of the image desired by the user is particular (for example, an extremely bright or dark condition). In this case, for example, when brightness correction is performed before original size detection, the boundary between the original and its background cannot be distinguished, thus failing the original size detection. This also applies not only to the original size detection but also to code recognition of a text, barcode, or the like. That is, when the brightness desired by the user is particular, a desired image may not be output. As will be described later, the present invention has been made not to influence, of the brightness settings described above, on the subsequent image processing.

More specifically, another aspect of the present invention features that when predetermined image processing and brightness correction processing based on a first brightness condition or a second brightness condition is performed for image data read from a sheet, the image processing of the image data is performed after brightness correction based on the first condition if a condition is the first brightness condition, and brightness correction based on the second brightness condition is performed after the image processing of the image data is performed if the condition is the second brightness condition.

The first brightness condition here is a condition by which the image processing accuracy does not degrade even if the brightness correction is performed by the first brightness condition. On the other hand, the second brightness condition is a condition in which the brightness is higher or lower than the first brightness condition, that is, is different from that of the first brightness condition. The second brightness condition is a condition in which the image processing accuracy may degrade if the image processing is performed for the image data after the brightness correction using the second brightness condition.

The first and the second brightness conditions can be distinguished from each other, based on the condition by which the subsequent image processing (for example, the original size detection or the like) is influenced when the brightness correction is performed and the condition by which almost no influence is given when the brightness correction is performed. That is, for example, when the image processing degradation caused by the brightness correction occurs, the first brightness correction condition can be set not to perform the brightness correction process using the first brightness correction unit, and the second brightness condition can be set to perform the brightness correction process performed by the second brightness correction unit.

The present invention, however, is not limited to these conditions. In the original size detection as an example of the image processing, there is a technique for specifying the boundary between the original and its background, i.e., the outer shape of the original upon discriminating an original shadow from the image. When performing the original size detection using such an original shadow, the original shadow may not be discriminated from the image due to the correction of the extreme brightness. Therefore, when the brightness correction is performed using a condition to some degree in which the original size detection is influenced (degree in which the size detection error occurs), the brightness correction is performed using the condition after the original size detection is performed, thereby assuring the accuracy of original size detection.

More specifically, in another embodiment, the brightness correction unit is controlled in accordance with at least one of the image processing and the brightness setting. That is, the other embodiment selectively controls whether the brightness correction is performed before or after the image processing in accordance with at least one of the image processing and the brightness setting. This makes it possible to control an optimal timing of the brightness correction in accordance with the image processing and the brightness setting, thereby providing a high-accuracy image desired by the user.

Figure 12:
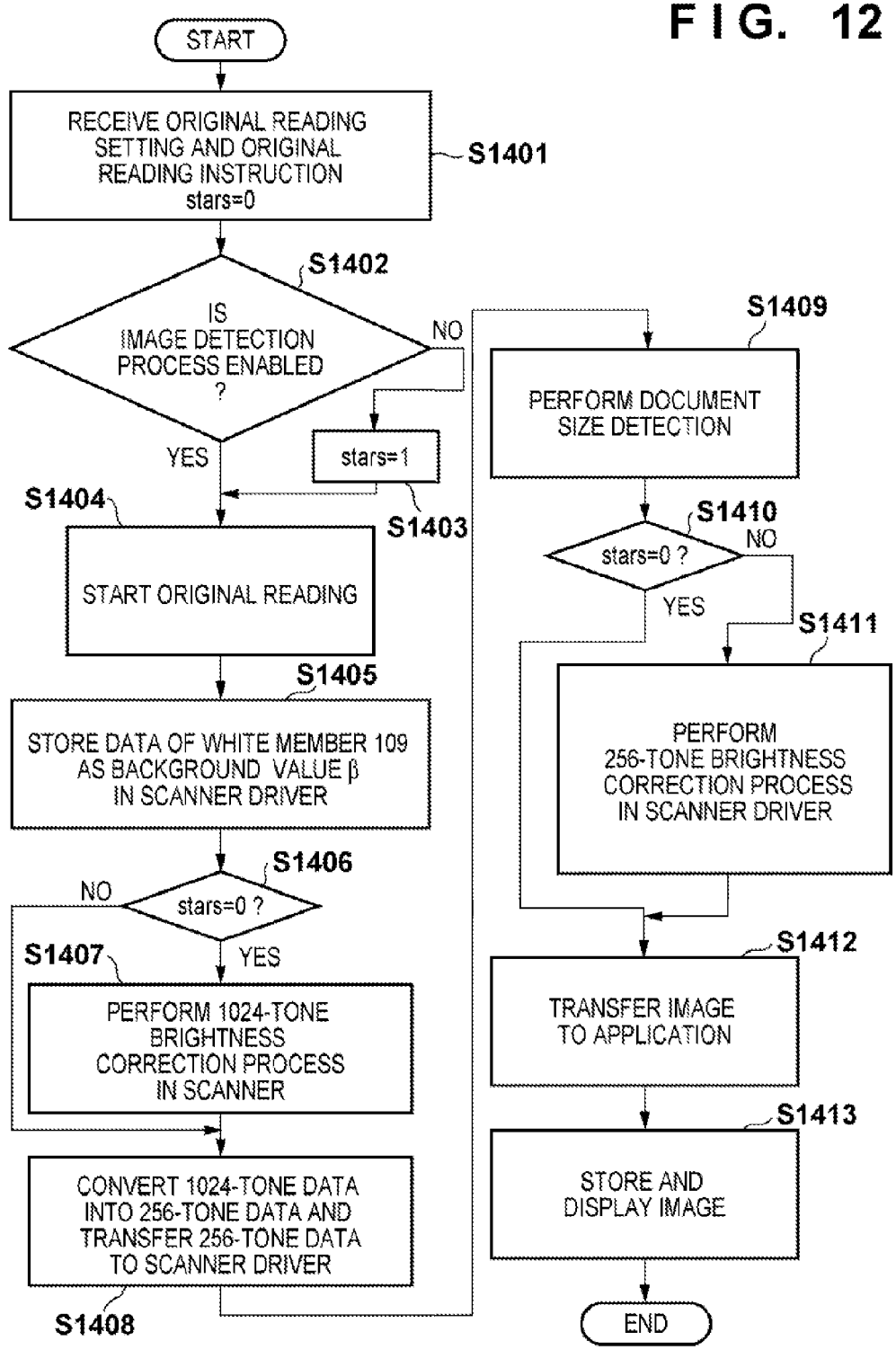
FIG. 12 is a flowchart from image data reception from an original to storage and display of the image data according to the other embodiment of the present invention.

An operation of a system constituted by the scanner 1101 and the PC 1300 will be described in detail with reference to FIGS. 9 to 12. FIG. 12 is a flowchart showing a process from the reception of image data from an original to the storage and display.

First of all, the user sets the brightness correction conditions (the first brightness condition and the second brightness condition) in addition to various settings of the image reading using the application 1301, and the application 1301 transmits the original reading instruction to the scanner driver 1302. In this embodiment, the CPU of the PC 1300 and the application 1301 executed by this CPU serve as a function of the brightness correction condition setting unit configured to appropriately set the brightness conditions within the predetermined range. Note that the CPU 1207 of the scanner may function as the brightness correction setting unit.

The scanner driver 1302, having received the original reading instruction (step S1401, stars=0), sets the first brightness condition so as to cause the image processor 1205 to perform the brightness correction process based on the brightness set by the user when it is determined that the image detection process is possible with the brightness set by the user ("YES" in step S1402). That is, in this embodiment, the image processor 1205 of the scanner 1101 functions as the first brightness correction unit. Note that in this embodiment, although the image processor 1205 is arranged, the CPU 1207 of the scanner 1101 and the program executed by the CPU 1207 may have a function equivalent to that of the image processor 1205 of this embodiment.

In the above case, the scanner driver 1302 sets the second brightness condition so as not to perform the brightness correction process in the scanner driver 1302. That is, in this embodiment, the CPU of the PC 1300 and the scanner driver 1302 executed by this CPU serve as the second brightness correction unit configured to perform the image brightness correction based on the second brightness condition. Note that although the scanner driver 1302 serves as the second brightness correction unit, all or some of the second brightness correction unit may be functioned by the application 1301.

When it is determined that the image detection process is not performed with the brightness setting made by the user ("NO" in step S1402), the CPU of the PC 1300 controls the image processor 1205 (the first brightness correction unit) in the scanner 1101 so as not to perform the brightness correction process. That is, the CPU of the PC 1300 has a role of determining, based on the brightness setting condition set by the user and the image processing condition, whether the scanner 1101 performs the brightness correction or the PC 1300 performs the brightness correction. The scanner 1101 may have a function of determining which component performs such a brightness correction process. Note that when the user designates the second brightness condition, the PC 1300 informs the scanner 1101 of the information indicating that the brightness correction is not performed in the scanner 1101 (the image processor 1205). In this case, the scanner 1101 transmits the read image data (that is, the image data having not undergone the brightness correction) to the PC 1300.

In addition, the second brightness correction condition is set so that the brightness correction process is to be performed in the scanner driver 1302 (the second brightness correction unit) (step S1403, stars=1).

After that, the scanner driver 1302 transmits the original reading setting made by the user to the scanner 1101, and then transmits the original reading start instruction to the scanner 1101.

The scanner 1101 receives the original reading start instruction from the scanner driver 1302 and starts reading the original based on the received reading setting and the first and second brightness conditions (step S1404).

When the original reading is started, the scanner 1101 reads the opposing member 1109 and stores the read value as a background value $\beta$ in a memory (not shown) via the scanner driver 1302 (step S1405). After that, the scanner 1101 reads the original. Upon acquiring the image data of the original, if it is determined that the image detection process is possible with the brightness setting made by the user (step S1406, stars=0), that is, if it is determined that the subsequent original size detection is possible in advance, the image processor 1205 (the first brightness correction unit) performs the brightness correction process with 1,024 tones (step S1407). The resultant image data is then converted into 256-tone data which is then transferred to the scanner driver 1302 (step S1408).

The scanner driver 1302, having received the image data, performs the original size detection (step S1409). After the original size detection, it is determined whether or not the brightness correction process has been performed (step S1410). If no brightness correction process has been performed (stars=1), the scanner driver 1302 (the second brightness correction unit) performs the 256-tone brightness correction process (step S1411). After that, the image data is transferred to the application 1301 (Step S1412). The application 1301, having received the image data, stores and displays the image.

In this embodiment, the image processor 1205 serves as the first brightness correction unit, while the scanner driver 1302 serves as the second brightness correction unit. The present invention, however, is not limited to this. For example, the first brightness correction unit is arranged on the input side of the image detection process, while the second brightness correction unit is arranged on the output side of the image detection process. In the first embodiment, although the PC 1300 performs control of the brightness correction unit, the scanner 1101 may perform this control. In this case, the scanner 1101 may be desired to incorporate the first brightness correction unit, the second brightness correction unit, and the image detection process.

Figure 13A:
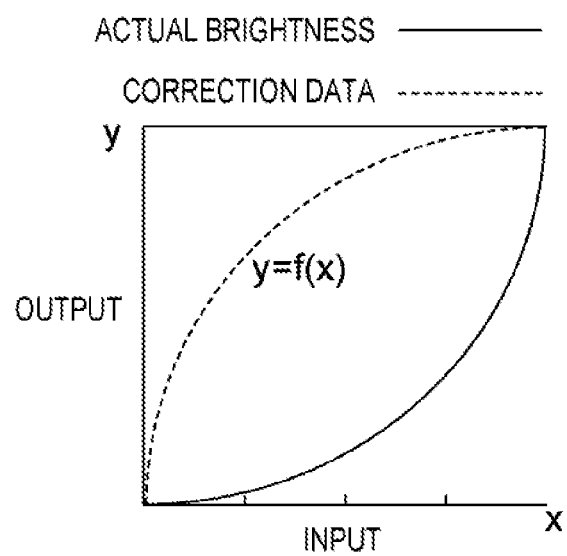
FIG. 13A is a graph associated with a brightness correction process according to the other embodiment of the present invention.
Figure 13B:
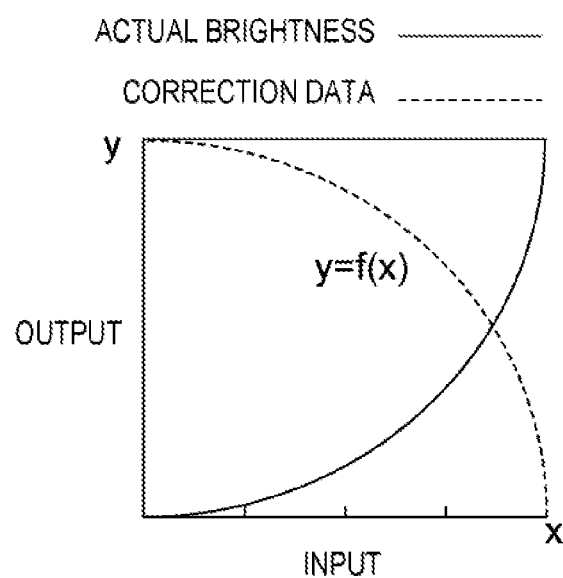
FIG. 13B is a graph associated with a brightness correction process according to the other embodiment of the present invention.

FIGS. 13A and 13B are views concerning the brightness correction process of this embodiment.

In this embodiment, the brightness correction process is to adjust the brightness of each pixel such that R, G, and B components of the image data, that is, R, G, and B pixels have brightness levels set by the user. In order to output an image having the brightness desired by the user, the above brightness correction process is performed. When an input value of each of the R, G, and B components is given as x (actual brightness in FIG. 13A) and the output brightness is given as y, the brightness correction process is expressed by y=f(x) (correction data in FIG. 13B).

In this case, f(x) is a correction formula used for the brightness correction process. The user can change the brightness correction formula f(x) so as to have an image having brightness desired by the user. Note that FIG. 13A shows a case in which the correction formula f(x) is applied to image data which is output as an overall dark image without any brightness correction, thereby adjusting the brightness of the image. FIG. 13B shows a case in which the image brightness is adjusted by applying a particular correction formula so as to obtain the brightness inverted from the actual brightness.

FIG. 14 is a view showing the reading unit 1108 and its vicinity to explain an operation of the original reading unit when reading an original.

FIG. 14 shows a state in which the reading unit 1108 reads the trailing end of the original. The light source 1121 is arranged along one side surface of the line image sensor 1120. When the original is conveyed, the original is obliquely irradiated with light from the light source 1121. The line image sensor 1120 reads light reflected by the original, thereby obtaining the image data of the original.

The glass plate 1106 is disposed between the line image sensor 1120 and the opposing member 1109. This glass plate 1106 has a role of preventing the opposing member 1109 from scratches or dirt. The glass plate 1106 also provides its thickness between the original and the opposing member 1109 to shield light from the light source 1121 when the original is conveyed until the trailing end and to produce the shadow portion 1122.

The original size detection used in this embodiment will be described below.

Prior to an explanation of the original size detection, a shadow detection operation will be described first. The shadow detection is performed by the following technique. When detecting the original edge (outer shape) prior to the original size detection, a boundary between the original and its background (the opposing member 1109 in this embodiment) is detected using an original shadow.

Figure 15:
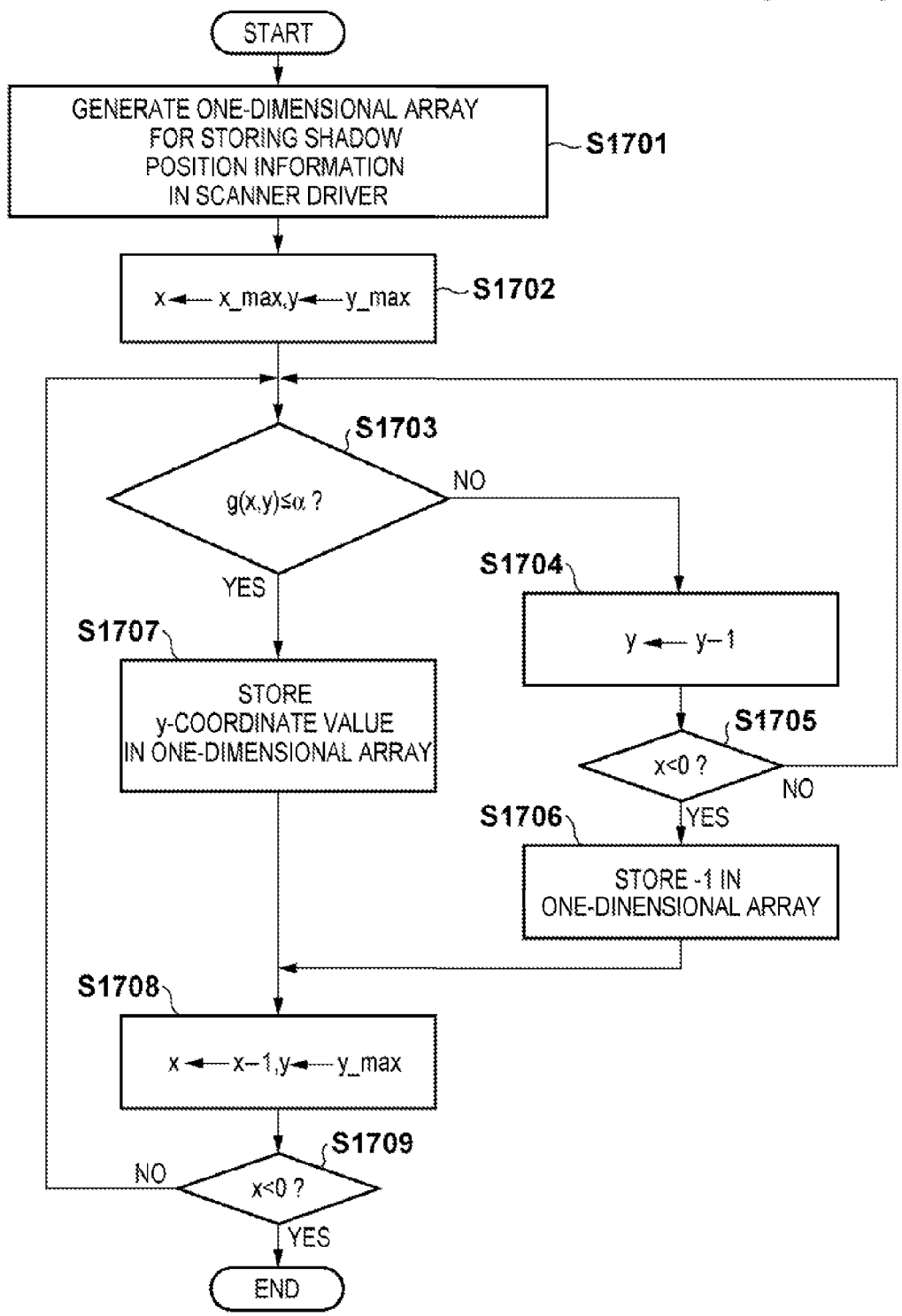
FIG. 15 is a flowchart associated with shadow detection according to the other embodiment of the present invention.
Figure 16:
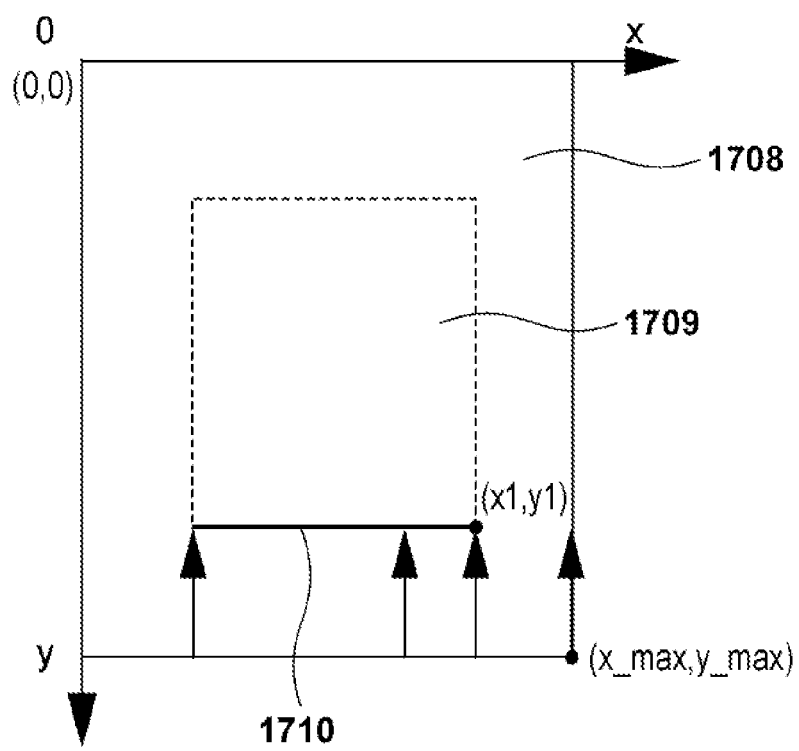
FIG. 16 is a view associated with shadow detection according to the other embodiment of the present invention.
Figure 17:
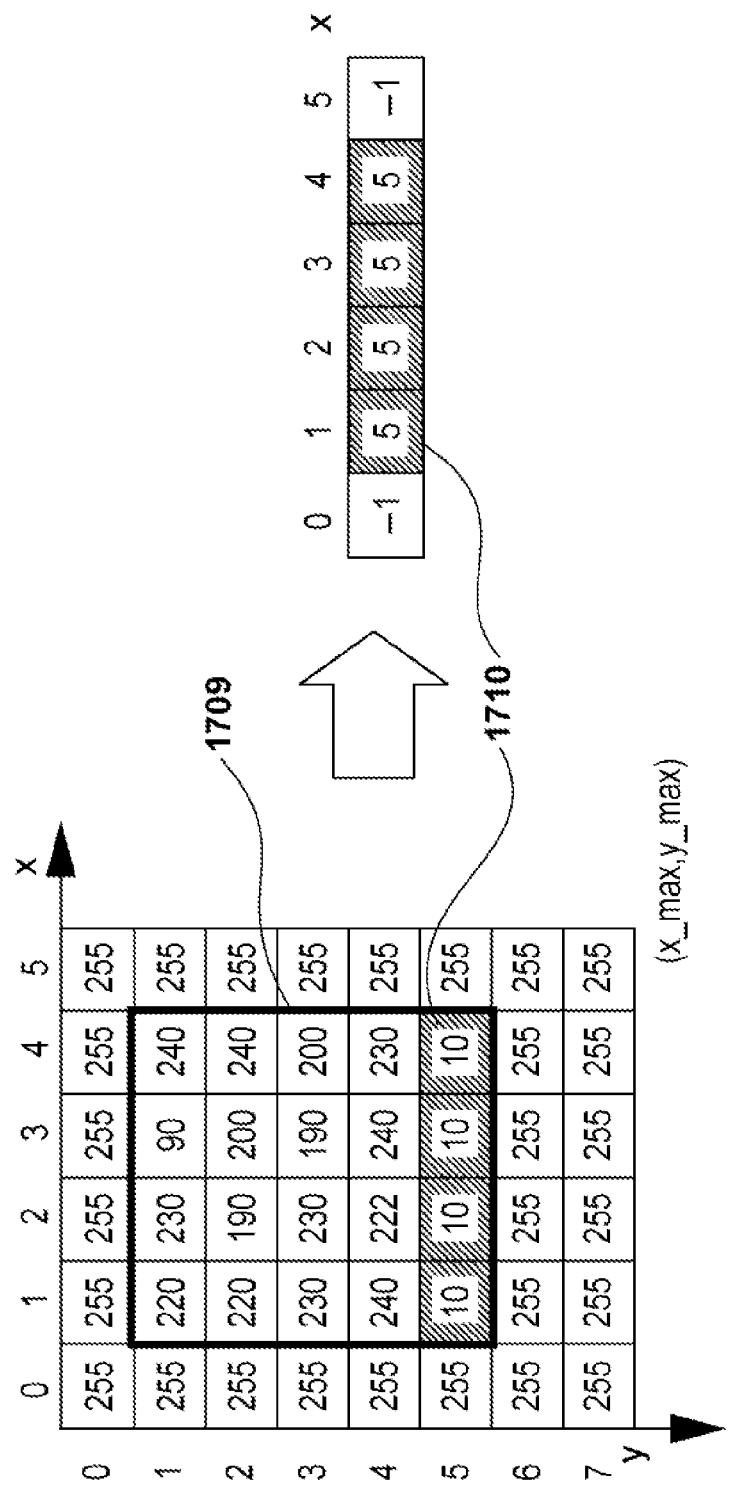
FIG. 17 is a view showing the enlarged pixels of image data and a one-dimensional array for storing shadow position information according to the other embodiment of the present invention.

FIG. 15 is a flowchart showing shadow detection used in original size detection. FIG. 16 is a view showing image data read associated with the shadow detection. FIG. 17 shows a one-dimensional array for storing the position information of an object and a shadow obtained by enlarging pixels of the image data. Note that the x-axis direction in FIG. 16 is defined as the main scanning direction, while the y-axis direction is defined as the subscanning direction.

A one-dimensional array shadow for storing the position information of a shadow in the scanner driver 1302 is ensured by an x-axis length of the image data (step S1701). For example, since the image data has six pixels in the x direction in FIG. 17, the length of the one-dimensional array to be ensured is 6. Assume that the lower right pixel coordinates of an image data portion 1708 are given as (x_max, y_max), and the upper left pixel coordinates are given as an origin (0, 0). A threshold α for determining a shadow is set in the scanner driver 1302 in advance.

The luminance value g(x, y) of each pixel of the image data is then compared with α. Scanning starts from the lower right coordinates (x_max, y_max) of the image data in the subscanning direction (step S1702) and the comparison between g(x, y) and α until the coordinates reach the coordinates (0, 0). When the luminance value of the pixel and the threshold α satisfy g(x, y)>α (step S1703), the value of the y-coordinate is set to y=y−1 (step S1704). In addition, when the value of y becomes smaller than 0 (step S1705), −1 is stored in the one-dimensional array shadow (step S1706).

After that, the value of the x-coordinate is set to x=x−1 and the value of the y-coordinate is set to y=y_max. Scanning is then repeated (step S1708). When the luminance value of the pixel and the threshold α satisfy g(x, y)≤α (step S1703), the corresponding coordinates are determined as one of the pixels of the shadow portion 1710 of the original 1709. The y-coordinate of the pixel is stored in the one-dimensional array shadow (step S1707). The value of the x-coordinate is set as x=x−1 and the value of the y-coordinate is set to y=y_max (step S1708). The scanning is then repeated. When the value of the x-coordinate becomes smaller than 0 (step S1709), the process ends.

FIG. 17 is a view when the threshold for determining a shadow is set as α=30. Scanning starts from the pixel coordinates (x_max, y_max) and continues until the coordinates g(x, y)=10, the y-coordinate is stored in the one-dimensional array shadow as the shadow portion 1710. After that, x=x−1 and y=y_max are set, and scanning continues. The scanning continues until the coordinates become (0, 0). The values except −1 stored in the one-dimensional array indicate the position of the shadow.

Figure 18:
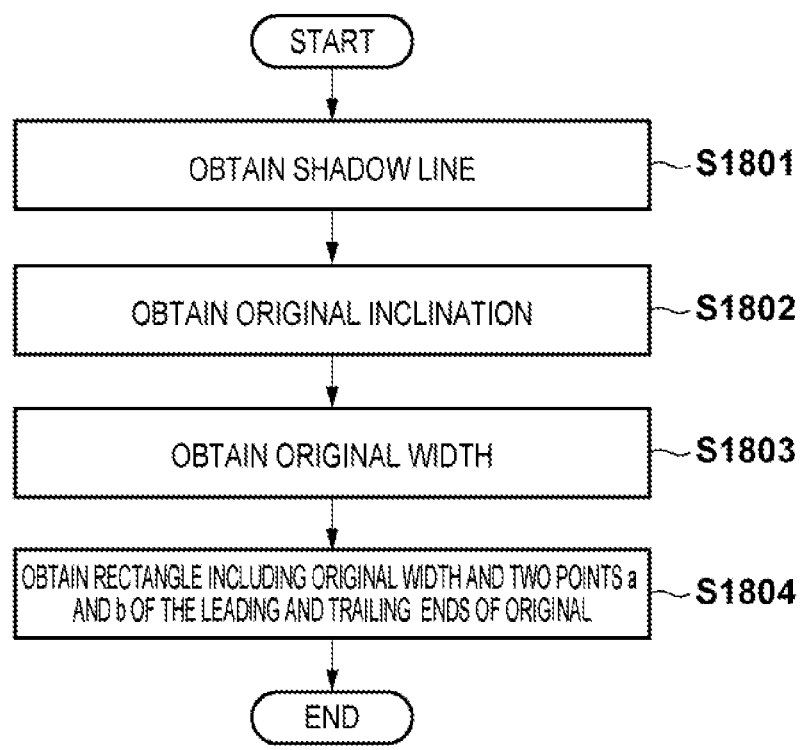
FIG. 18 is a flowchart showing original size detection according to the other embodiment of the present invention.
Figure 19:
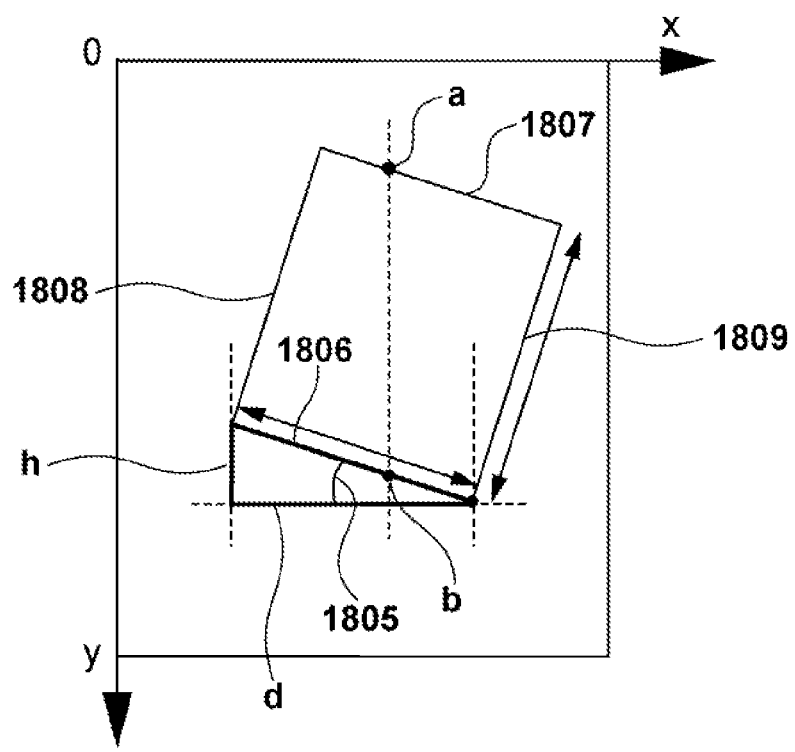
FIG. 19 is a view associated with shadow detection according to the other embodiment of the present invention.
Figure 20:
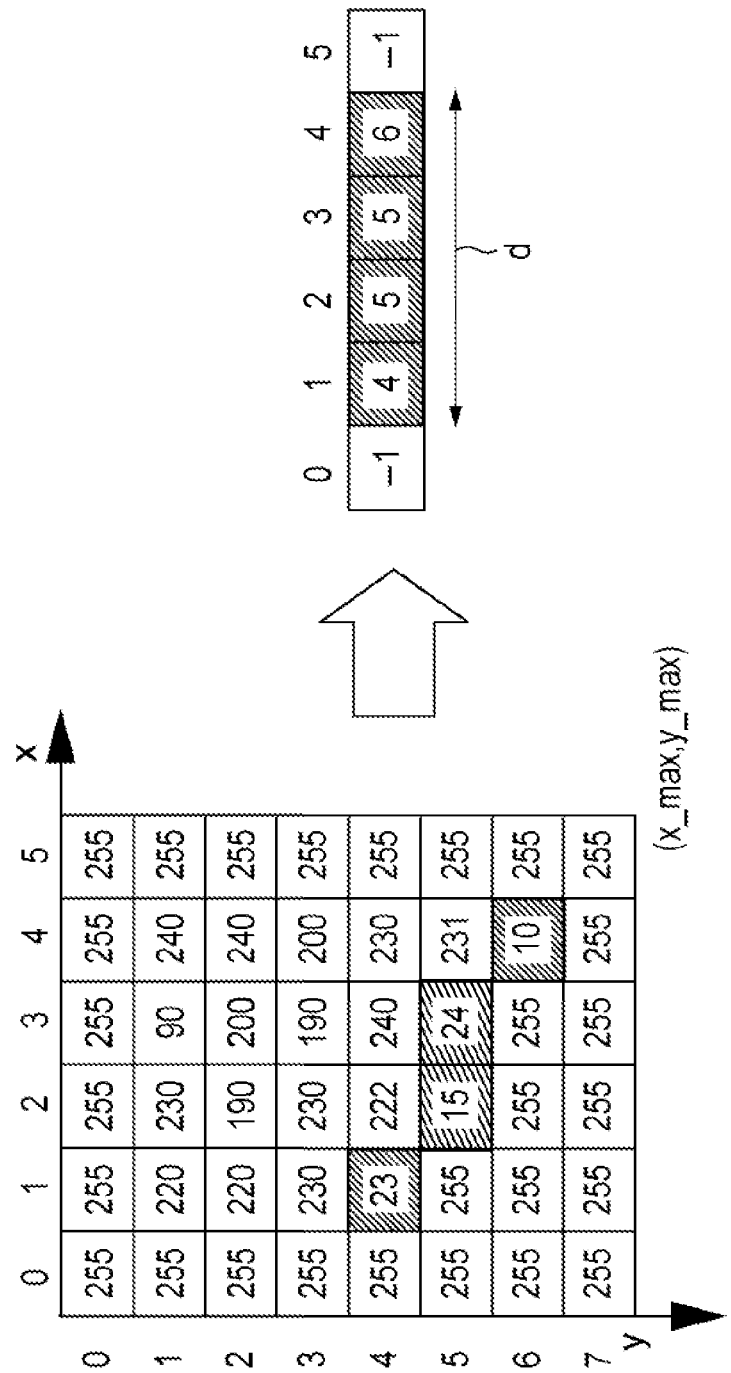
FIG. 20 is a view showing a one-dimensional array which stores shadow position information according to the other embodiment of the present invention.

The original size detection will now be described based on the shadow detected in shadow detection. FIG. 18 is a flowchart associated with the original size detection. FIG. 19 shows the original subjected to the size detection. In addition, FIG. 20 shows the one-dimensional array in which the shadow position information is stored.

A line d from the rightmost shadow to the leftmost shadow is calculated from the one-dimensional array which stores the shadow position information detected in the shadow detection (step S1801).

An original inclination 1805 is then calculated as θ (theta) (step S1802). A height h of the original inclination is calculated using the difference between the leftmost shadow and the rightmost shadow from the shadow position information detected in the shadow detection. The shadow line d and the height h of the original inclination can derive tan θ=(h/d). The inclination θ can be obtained from Arctan(h/d)=θ. For example, in FIG. 20, the height h of the original inclination becomes 6−4=2 from the difference between the y-coordinates of the leftmost and rightmost shadows. The line d of the shadow becomes 4−1=3 from the difference between x-coordinates of the rightmost and leftmost shadows. Therefore, tan θ=(2/3) and Arctan(2/3)=33.69, thereby obtaining the inclination θ of the original as about 34°.

An original width 1806 is then calculated from the height h of the original inclination and the line d of the shadow (step S1803). The original width 1806 is calculated by $\sqrt{(h^2+d^2)}$. The calculated original width 1806 is defined as a lower side portion of the original.

Finally, the frame of the original is detected (step S1804). First of all, when the leading end of the original passes through the registration sensor 1110, the CPU 1207 of the scanner 1101 transmits a reading start instruction after t0 sec. Upon reception of the instruction, the image reading unit 1108 starts reading the image. Note that even if the original is inclined, the image is read with a reading margin which allows reading of all the original. The time t0 is determined in accordance with the margin. Coordinates a of the leading end of the original are calculated from the convey speed of the original and the time at which the leading end of the original has passed through the registration sensor 1110 and are stored in the scanner driver 1302.

When the trailing end of the original has passed through the registration sensor 1110, the CPU 1207 transmits an image reading end instruction after t1 sec. Upon reception of the instruction, the image reading unit 1108 ends the image reading after t1 sec. Note that even if the original is inclined, the image is read with a reading margin which allows reading of all the original. The time t1 is determined in accordance with the margin.

Coordinates b of the trailing end of the original are calculated from the original convey speed and the time at which the trailing end of the original has passed through the registration sensor 1110 and are stored in the scanner driver 1302. An upper side portion 1807 of an original having a length parallel to and equal to the inclination θ and original width 1806 is calculated including the coordinates a and b of the leading and trailing ends of the original. The corresponding end points of the lower side portion 1806 of the original and the upper side portion 1807 of the original are connected by corresponding perpendiculars to detect a left side 1808 and a right side 1809 of the original.

Figure 21:
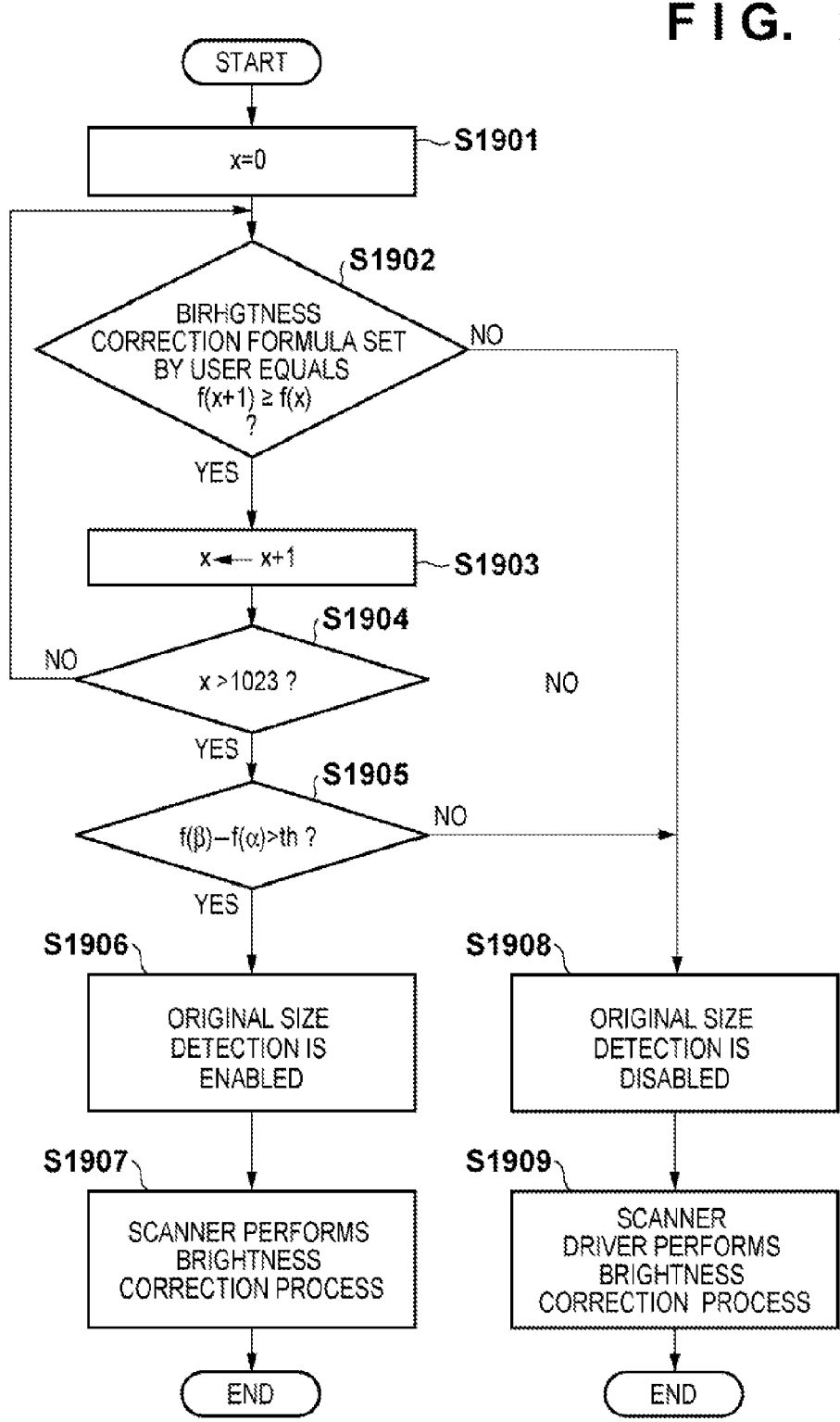
FIG. 21 is a flowchart associated with the determination method of enabling/disabling an image detection process according to the other embodiment of the present invention.

FIG. 21 is a flowchart of original size detection enable/disable determination.

As shown in FIG. 21, an input value is set as x in the brightness correction formula set by the user (step S1901). Whether the luminance value after the brightness correction process satisfies f(x+1)≥f(x) is determined (step S1902). Note that the input value x satisfies 0≤x≤1023 (steps S1903 and S1904) (in this embodiment, the brightness setting is limited to a monotonic incrementing setting (for example, FIG. 13A). In addition, when the correction data decreases or the brightness correction formula is particular, it is determined that the original size detection is disabled (for example, FIG. 13B)). If the luminance value after the brightness correction process satisfies f(x+1)<f(x), it is determined after the brightness correction process that the original size detection is disabled (step S1908). The scanner driver 1302 is set to perform the brightness correction process after the original size detection (step S1909).

If f(x+1)≥f(x) is satisfied, the threshold a set in the scanner driver 1302 in advance is compared with a shadow threshold β of the white member 1109 which serves as the background value (step S1905). In this case, a background and shadow threshold th is set in the scanner driver 1302 in advance. After the brightness correction process, if f(β)−f(α)>th, it is determined that the original size detection is satisfactorily enabled even after the brightness correction process (step S1906). The scanner 1101 performs the brightness correction process (step S1907). To the contrary, if f(β)−f(α)≤th, it is determined that the original size detection is disabled after the brightness correction process (step S1908). The scanner driver 1302 is set to perform the brightness correction process (step S1909).

Note that the arrangement of the scanner 1101 shown in FIG. 9 is schematic, and this arrangement is not limited to this embodiment.

This embodiment uses the sheet feed type scanner 1101, but may use a flatbed type scanner.

The original size detection and the method of determining whether the original size detection is enabled or disabled are not limited to those used in this embodiment.

Although the image detection process is given as the original size detection process in this embodiment, the image detection process is not limited to the original size detection process. For example, the image detection process may be a barcode detection process, a character recognition process, a process of detecting a dust and stripe in an image, or a white paper determination process.

In this embodiment, although the method of determining whether the image detection process is enabled or disabled is performed based on the luminance information, the method may be performed based on another information. For example, when scanning a color image, the brightness correction process can use brightness correction formulas different for R, G, and B. However, when the different brightness correction formulas are used for R, G, and B, the hue and saturation of the image change. For this reason, a detection process based on the hue such as a color misregistration detection process or an original color fade-out detection process, or a detection process based on the saturation such as a color/monochrome detection process for determining whether a read original is a color or monochrome original cannot be properly performed. For example, assume that the image detection process is the color misregistration detection process. In this case, only when the R, G, and B brightness correction formulas match, the scanner 1101 performs the brightness correction process, and the scanner driver 1302 performs the color misregistration detection process. If only one of the brightness correction formulas is different from the remaining formulas, the scanner driver 1302 may perform the color misregistration detection process and the brightness correction process.

As a modification of the above-mentioned other embodiment of the present invention, still another embodiment will be described below. In this embodiment of the present invention, a location where a brightness correction process is performed is switched to the scanner 1101 or the scanner driver 1302. However, the present invention can perform the brightness correction process in both the scanner 1101 and the scanner driver 1302 in accordance with the brightness setting made by the user. For example, when a brightness setting made by the user is particular (for example, the brightness setting for inverting the image brightness as shown in FIG. 13B), the scanner 1101 and the scanner driver 1302 perform brightness correction processes having different correction conditions before and after the image processing. There can be provided a high-quality image even under the particular brightness setting.

Figure 22:
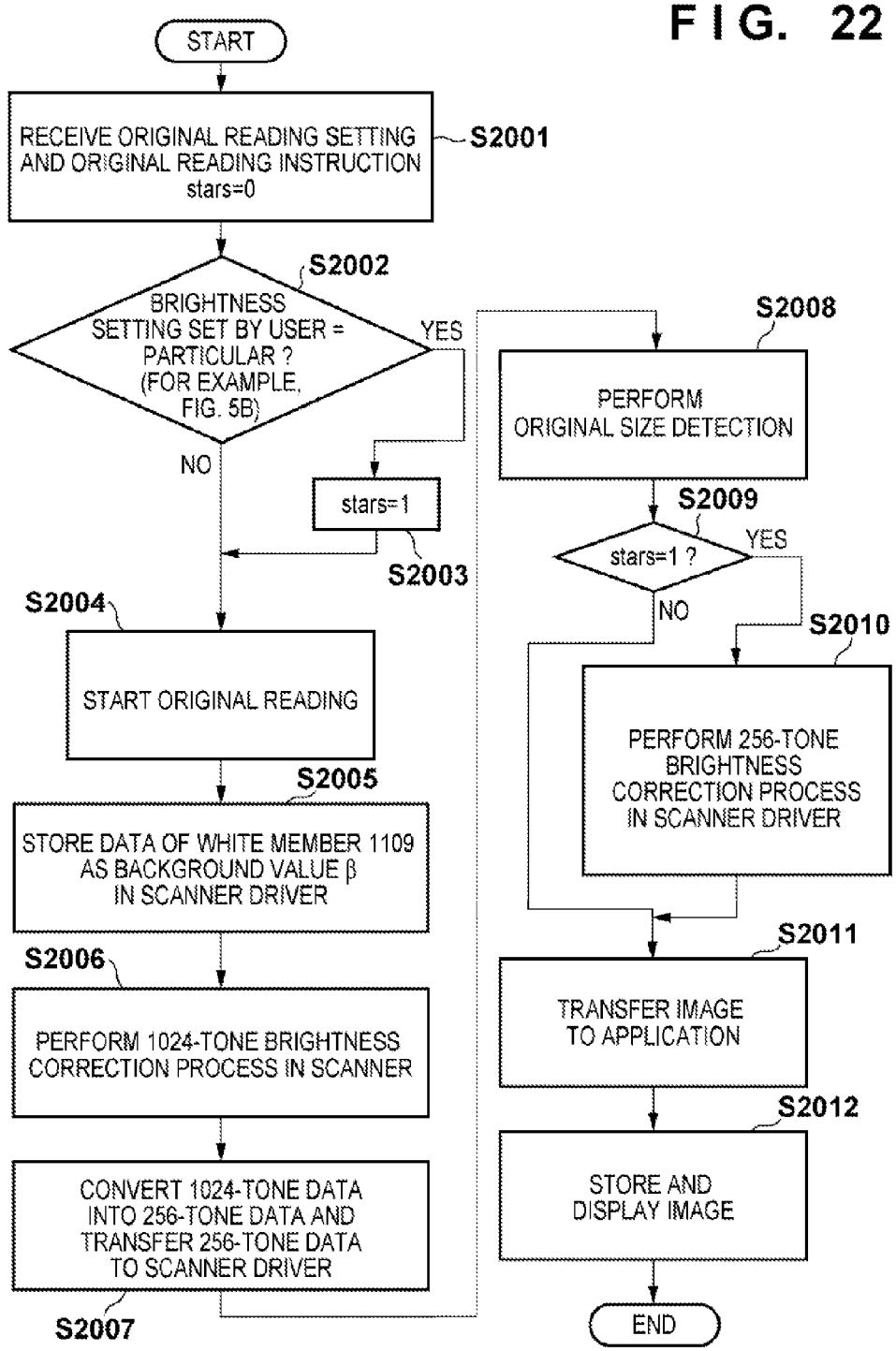
FIG. 22 is a flowchart from original reading in which the setting of brightness set by the user is particular to storage and display of the image data according to the other embodiment of the present invention.

FIG. 22 is a flowchart of operations from original reading to storage and display when the brightness setting made by the user is particular.

First of all, the user makes various kinds of original reading settings using the application 1301. The application 1301 transmits an original scan instruction.

Upon reception of the original reading instruction, the scanner driver 1302 transmits the original reading setting made by the user to the scanner 1101, and then transmits an original reading start instruction to the scanner 1101.

The scanner 1101, having received the original reading start instruction from the scanner driver 1302 (step S2001), determines whether or not the received brightness setting made by the user is particular (step S2002). If YES, the scanner 1101 and the scanner driver 1302 are set to perform the brightness correction processes (step S2003, stars=1). After the determination of the brightness correction processes, the scanner 1101 starts reading the original (step S2004). When the original reading is started, the scanner 1101 reads the white member 1109 first and stores the read value as the background value β in the scanner driver 1302 (step S2005). After that, the scanner 1101 reads the original.

After the original image data is acquired, the 1024-tone brightness correction process is performed as in a case in which the brightness setting is given as a predetermined value (step S2006). The image data is then converted into 256-tone data and transferred to the scanner driver 1302 (step S2007).

Upon reception of the image data, the scanner driver 1302 performs original size detection (step S2008). The scanner driver 1302 then determines whether or not the brightness setting made by the user is particular (step S2009). If YES (stars=1), the scanner driver 1302 performs 256-tone brightness correction process (step S2010). The scanner driver 1302 then transfers the image data to the application 1301 (step S2011).

Upon reception of the image data, the application 1301 stores and displays the image (step S2012).

Figure 23:
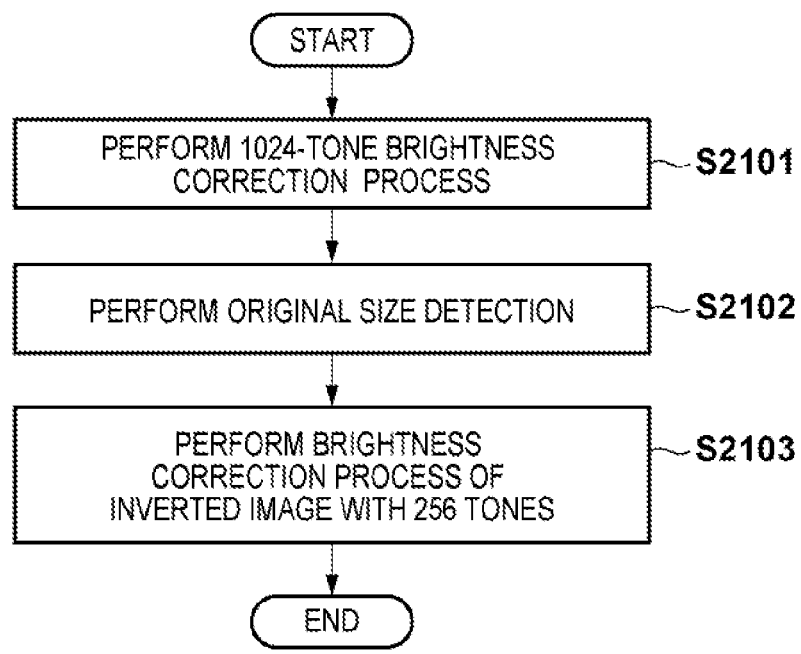
FIG. 23 is a flowchart of a correction process in which brightness settings are inversion of brightness according to the other embodiment of the present invention.

FIG. 23 is a flowchart of a brightness correction process when the brightness setting is particular (FIG. 13B) such that the brightness set by the user becomes brightness inverted from the actual brightness.

First of all, when the scanner 1101 reads the original, it does not perform a brightness correction process by which the brightness is inverted. The scanner 1101 performs a 1024-tone brightness correction process as in the predetermined value (step S2101, FIG. 24). After that, the 1024-tone data is converted into 256-tone data, which is then transferred to the scanner driver 1302.

Upon reception of the image data, the scanner driver 1302 performs original size detection (step S2102). The scanner driver 1302 then performs a 256-tone brightness correction process by which the brightness set by the user is inverted (step S2103, FIG. 24). After that, the scanner driver 1302 transfers the image data to the application 1301.

According to the technique used in this embodiment, the scanner 1101 side performs 1024-tone brightness correction process, and the brightness correction process in the scanner driver 1302 does not impair tonality. This makes it possible to provide a high-quality image.

The brightness correction processes include shading correction for correcting the variations in light-receiving elements aligned on a line or surface, gamma processing, simple brightness shifting, and contrast correction. These brightness correction processes are performed singly or in a combination.

This embodiment uses the sheet feed type scanner 1101, but may use a flatbed type scanner.

The original size detection serving as the image detection process used in this embodiment is the same as those of the above embodiments.

This embodiment can be practiced in a combination with the other embodiments described above. For example, when it is determined in step S2002 that the brightness correction formula is not a particular brightness correction formula, the image detection enable/disable determination as in the embodiment described above may be performed. If it is determined that the image detection process is disabled, the scanner 1101 does not perform the brightness correction process the scanner driver 1302 performs the image detection process and then the brightness correction process.

The image detection process used in this embodiment is not limited to the original size detection process as in the other embodiments described above. The image detection processes may be a barcode detection process, a character recognition process, a process of detecting a dust and stripe in an image, a white paper determination process, a color misregistration detection process, a color fade-out detection process, and a color/monochrome detection process. Any other image processing includes an image compression/decompression process of performing lossless compression or lossy compression at the time of image data transfer to reduce a data size, transferring the image data, and then decompressing the image data.

In this embodiment, a series of image processing form a consistent sequence from the line image sensor 1120 to the application 1301. However, the present invention may be applied to an image processing scheme (to be referred to as a multistream process hereinafter) in which a plurality of different image processes are performed midway along an image process and a plurality of images created by the respective image processes are sent to the application 1301.

For example, as has been described above, the brightness correction process performed by the scanner 1101 can shorten the image transfer time and provide a high-quality image. Note that in the above multistream process in which a plurality of image processes are combined, when all the processes are performed in the scanner 1101, the image processing amount of the scanner 1101 and the data transfer time after the processes greatly increase. In the multistream process, some of the shading correction and brightness correction processes are performed in the scanner 1101, the image data are transferred to the PC 1300 side, and then image processing may be performed in the PC 1300.

As an example, assume that photographic color image output and document gray output are selected as the multistream process. This is because a document scanner may handle a plurality of kinds of originals in which a photographic original and a document original are mixed. Brightness correction may be reduced in the photographic original to adjust the ground color of the photographic background portion so as not to cause highlight detail loss of the ground color. In contrast, brightness correction may be increased in the document original to adjust the ground color of the document original background until the ground color becomes white.

When these two processes are selected, the scanner 1101 performs the processes until the brightness correction process for the photographic original. The scanner 1101 performs lossless or lossy data compression depending on the transfer data condition. After the data is transferred to the PC, data decompression is performed depending on the given condition, and the processes are separated into the photographic color image output process and the document gray output process. In the photographic color image output process, if any other image processing need not be performed, the data is output without performing brightness adjustment. In the document gray image output process, the PC performs the brightness correction process until the ground color of the document original background becomes white, and the resultant image data becomes the document gray output data.

In the image reading process in which the photographic original and the document original are mixed, the above processing allows a series of processes without degrading the original image quality while a decrease in the overall processing speed is minimized.

The above description has been made for the photographic color image processing and the document original gray processing. A correction degree of a plurality of brightness correction units may be appropriately adjusted in an image processing unit obtained by combining other image processing.

In addition, the brightness setting unit may be individually set for a plurality of processing sequences. In this case, the correction amount by the brightness correction unit implemented in the scanner 1101 is the set minimum correction amount, and the remaining brightness correction units perform brightness correction using, as a correction amount, a difference obtained by subtracting the minimum correction amount from the set correction amount. For example, in an image processing system, the correction ratios of the plurality of brightness correction units (more specifically, the brightness correction unit in the scanner 1101 and the brightness correction unit in the PC 1300) may be adjusted based on a least one of the image process setting and brightness setting. In this case, the plurality of brightness correction units are desired to be controlled to obtain the desired quality of a finally obtained image. It is more desired not to make the brightness correction influence other processes during the image processing.

Although not shown, there may be provided an image process enable/disable determination unit configured to determine, based on the correction ratios of the plurality of brightness correction units, whether or not image processing by an image processing unit is enabled. In this case, the control unit of the PC 1300 or scanner 1101, that is, two CPUs or at least one CPU may readjust the correction ratios by the plurality of brightness correction units based on the result obtained by the image process enable/disable determination unit. This makes it possible to provide a system with good operability without requesting the user extra operations.

The divisional brightness correction processes in the scanner 1101 and the scanner are not limited to this embodiment. This is also applicable to particular brightness settings for a color-reduced image such as a binary image, an image in which a specific brightness region is extremely brightened and darkened, kept constant, or is inverted, an image whose overall luminance is equally increased or decreased, or the like.

The present invention has been described based on the other embodiment and the still other embodiment. However, the present invention is not limited to the embodiments described above.

For example, in the above embodiments, the image processing system is constructed using the scanner 1101 and the PC 1300. However, the present invention is not limited to this. A system may be constructed using the electrical circuit of the scanner 1101 serving as the image reading apparatus and the PC 1300 serving as the information terminal apparatus.

According to the present invention, there may be provided an image processing system comprising: an image input unit configured to input an image; a brightness setting unit configured to set the brightness of the image; a brightness correction unit configured to correct the brightness of the image based on a brightness setting; an image processing unit configured to perform image processing (image detection process); and a control unit configured to control the brightness correction unit in accordance with at least one of the image processing and the brightness setting. In this case, the control unit selectively controls as to whether the brightness correction before the image processing or the brightness correction after the image process in accordance with at least one of the image processing and the brightness setting. This makes it possible to provide a high-quality image desired by the user because the brightness correction is controlled at an optimum timing in accordance with the image processing and the brightness setting.

In the above image processing system and the systems of the above embodiments, the brightness correction process for the image data may be a process for uniformly increasing or decreasing the R, G, B component values of the image data. For example, in the 256 tones, the tones of the R, G, and B components are uniformly increased or decreased. This makes it possible for the user to obtain a desired bright image.

The image processing for the image data may be detecting the existence region or outer shape of a sheet based on a boundary between the sheet region and its background region included in the image data. Detection of a sheet existence region and the like includes a case of detecting information of the respective sheet corner coordinates of a rectangle.

The image processing for the image data may be detecting an inclination of a sheet based on the sheet region and its background region included in the image data. The sheet inclination is a sheet inclination with respect to the sheet convey direction in the sheet feed scanner or a sheet inclination with respect to the scanning direction of the reading unit in the flatbed scanner.

The above image processing includes at least one of a sheet outer shape detection process, a character recognition process, an image abnormality detection process, a color misregistration determination process, a color determination process, and a barcode detection process, or a combination thereof. The combination here includes a combination with a detection process for the sheet existence region, its outer shape, its inclination, and the like.

The present invention may further comprise: a brightness correction request accepting unit (for example, an input setting screen such as a user interface displayed on the PC display) configured to accept a brightness correction request from a user; an image preprocess determination unit configured to determine in advance whether or not image processing by the image processing unit is enabled; and a control unit configured to control a subsequent order of the brightness correction process and the image processing based on the determination result of the image preprocess determination unit. That is, when the image read from the sheet is accepted and then at least one of the plurality of brightness correction units performs the correction of the image brightness, the plurality of brightness correction units and the order of the image processes are controlled based on at least one of the image process setting condition and the brightness setting for the image. This can optimize the respective processes and their order. The quality of a finally obtained image can be improved. For example, the degradation of the accuracy of the subsequent image processing by the brightness correction can effectively be prevented.

Note that the brightness correction condition setting unit may set the brightness correction conditions for the brightness correction request from the user as the first and second brightness conditions, based on the determination result of the image preprocess determination unit. This makes it possible to effectively prevent the degradation of the accuracy of the subsequent image processing using the brightness correction.

According to the present invention, assume that predetermined image processing and a brightness correction process based on the first and second brightness conditions are performed for the image data read from the sheet. In the first brightness condition, brightness correction of the image data may be performed based on the first brightness condition, and then the image processing may be performed. In the second brightness condition, the image processing of the image data may be performed, and then the brightness correction process may be performed based on the second brightness condition. The present invention can also incorporate software (computer program) for causing a computer to execute the predetermined image processing and the brightness correction process.

The present invention is not limited to the above embodiments and various changes and modifications can be made within the spirit and scope of the present invention. Therefore, to apprise the public of the scope of the present invention, the following claims are made.

What is claimed is:

1. An image reading system comprising an image reading apparatus and an information processing apparatus which is connectable to the image reading apparatus and acquires image data from the image reading apparatus, wherein the image reading apparatus is an external apparatus with respect to the information processing apparatus, the image reading apparatus comprises:
a reading unit configured to read an image of an original to generate image data;
a first correction unit configured to perform gamma correction of the image data generated by the reading unit, in accordance with a first correction characteristic; and
a transmission unit configured to transmit the image data corrected by the first correction unit to the information processing apparatus, and the information processing apparatus comprises:
a first determination unit configured to, upon reception of image data transmitted from the transmission unit of the image reading apparatus, determine an image characteristic indicated by the received image data;
a second determination unit configured to determine whether or not the image characteristic determined by the first determination unit corresponds to the first correction characteristic; and
a second correction unit configured to, when the second determination unit determines that the image characteristic does not correspond to the first correction characteristic, perform gamma correction of the received image data in accordance with an inverse characteristic of the first correction characteristic and perform gamma correction of the received image data in accordance with a second correction characteristic corresponding to the image characteristic.

2. The image reading system according to claim 1, wherein the image reading apparatus further comprises a conversion unit configured to convert the image data corrected by the first correction unit into image data, a number of tones of which is reduced, and
the transmission unit transmits image data converted by the conversion unit to the information processing apparatus.

3. The image reading system according to claim 1, wherein the information processing apparatus further comprises a designation unit configured to designate, as a mode for reading an image by the reading unit, one of a multicolor mode for generating image data of a multicolor image, a monocolor mode for generating image data of a monocolor image, and an automatic determination mode for automatically determining a color of an image read by the reading unit and generating image data in accordance with a determination result, and notify the image reading apparatus of the designated mode,
the first correction characteristic is a correction characteristic corresponding to a monocolor image in the monocolor mode, and a correction characteristic corresponding to a multicolor image in one of the multicolor mode and the automatic determination mode,
the first determination unit determines in the automatic determination mode whether an image based on the received image data is a multicolor image or a monocolor image, and
the first determination unit, the second determination unit, and the second correction unit execute respective processes only when the designation unit designates the automatic determination mode.

4. The image reading system according to claim 3, wherein the information processing apparatus further comprises an output unit configured to:
output the received image data in one of the monocolor mode and the multicolor mode; and
output the received image data when the first determination unit determines that the image characteristic corresponds to the first correction characteristic and output image data corrected by the second correction unit when the first determination unit determines that the image characteristic does not correspond to the first correction characteristic.

5. The image reading system according to claim 3, wherein the first determination unit comprises an unit configured to calculate a saturation of some or all pixels included in the received image data, and
determines that whether an image based on the received image data is a multicolor image or a monocolor image, based on a total number of pixels, out of the some or all pixels, which have the calculated saturations equal to or higher than a predetermined threshold.

6. The image reading system according to claim 1, wherein the first determination unit determines brightness of an image indicated by the received image data, and
the first correction characteristic and the second correction characteristic are correction characteristics corresponding to different image brightness levels.

7. An image reading system comprising an image reading apparatus which comprises a reading unit configured to read an image of an original to generate image data, and an information processing apparatus which is connectable to the image reading apparatus and acquires image data from the image reading apparatus, wherein the image reading apparatus is an external apparatus with respect to the information processing apparatus, the image reading system comprising:
a brightness setting unit configured to set brightness of an image to perform correction of the image data generated by the reading unit;
a plurality of brightness correction units configured to perform brightness correction, based on respective brightness correction conditions which are different from each other, of the image data generated by the reading unit so as to set the brightness of the image to brightness set by the brightness setting unit;
an image processing unit configured to perform image processing of the image data generated by the reading unit, based on a predetermined setting condition; and
a control unit configured to control the plurality of brightness correction units based on at least one of the predetermined setting condition and the brightness setting,
wherein the plurality of brightness correction units comprises:
at least one first brightness correction unit, arranged in the image reading apparatus, configured to perform first brightness correction of the image data generated by the reading unit; and
at least one second brightness correction unit, arranged in the information processing apparatus, configured to perform second brightness correction of the image data acquired from the image reading apparatus by the information processing apparatus, and
wherein the control unit causes the first brightness correction unit to perform the first brightness correction of the image data generated by the reading unit, and causes the second brightness correction unit to perform the second brightness correction of the image data which has undergone the first brightness correction.

8. The image reading system according to claim 7, wherein the control unit adjusts correction ratios in respective brightness corrections in the plurality of brightness correction unit, based on at least one of the predetermined setting condition and the brightness setting.

9. The image reading system according to claim 7, further comprising a determination unit configured to determine, based on correction ratios by the plurality of brightness correction unit, whether or not image processing according to the predetermined setting condition by the image processing unit can be applied to the image data generated by the reading unit.

10. The image reading system according to claim 9, wherein the control unit readjusts the correction ratios in the brightness corrections by the plurality of brightness correction unit based on a determination result of the decision unit.

11. An image reading system comprising an image reading apparatus which comprises a reading unit configured to read an image of an original to generate image data, and an information processing apparatus which is connectable to the image reading apparatus and acquires image data from the image reading apparatus, wherein the image reading apparatus is an external apparatus with respect to the information processing apparatus, the image reading system comprising:
- a brightness setting unit configured to set brightness of an image to perform correction of the image data generated by the reading unit;
- a plurality of brightness correction units configured to perform brightness correction, based on respective correction conditions which are different from each other, of the image data generated by the reading unit so as to set the brightness of the image to brightness set by the brightness setting unit;
- an image processing unit configured to perform image processing of the image data generated by the reading unit, based on a predetermined setting condition; and
- a control unit configured to control the plurality of brightness correction units based on at least one of the predetermined setting condition and the brightness setting,
- wherein the plurality of brightness correction units comprises:
  - at least one first brightness correction unit, arranged in the image reading apparatus, configured to perform first brightness correction of the image data generated by the reading unit; and
  - at least one second brightness correction unit, arranged in the information processing apparatus, configured to perform second brightness correction of the image data acquired from the image reading apparatus by the information processing apparatus, and
- wherein the control unit:
  - in a case where a brightness correction condition based on at least one of the predetermined setting condition and the brightness setting is a first brightness correction condition, selects the first brightness correction unit from among the plurality of brightness correction unit and causes the first brightness correction unit to execute the first brightness correction of the image data generated by the reading unit; and
  - in case where the brightness correction condition is a second brightness correction condition which is different from the first brightness correction condition, selects the second brightness correction unit from among the plurality of brightness correction unit and causes the second brightness correction unit to execute the second brightness correction of the image data generated by the reading unit.

12. The image reading system according to claim 11, wherein the image processing unit performs, as the image processing, processing for detecting a size of the original based on the image data.

13. An information processing apparatus which is connectable to an image reading apparatus comprising: a reading unit configured to read an image of an original to generate image data; a first correction unit configured to perform gamma correction of the image data generated by the reading unit using a first correction characteristic; and a transmission unit configured to transmit image data corrected by the first correction unit to the information processing apparatus, the information processing apparatus acquiring image data from the image reading apparatus, which is an external apparatus with respect to the information processing apparatus, and comprising:
- a first determination unit configured to, upon reception of image data transmitted from the transmission unit of the image reading apparatus, determine an image characteristic indicated by the received image data,
- a second determination unit configured to determine whether or not the image characteristic determined by the first determination unit corresponds to the first correction characteristic, and
- a second correction unit configured to, when the second determination unit determines that the image characteristic does not correspond to the first correction characteristic, perform gamma correction of the received image data in accordance with an inverse characteristic of the first correction characteristic and perform gamma correction of the received image data in accordance with a second correction characteristic corresponding to the image characteristic.

14. A non-transitory computer-readable storage medium storing a computer program for causing a computer to function as an information processing apparatus which is connectable to an image reading apparatus comprising: a reading unit configured to read an image of an original to generate image data; a first correction unit configured to perform gamma correction of the image data generated by the reading unit using a first correction characteristic; and a transmission unit configured to transmit image data corrected by the first correction unit to the information processing apparatus, the information processing apparatus acquiring image data from the image reading apparatus, which is an external apparatus with respect to the information processing apparatus, and comprising:
- a first determination unit configured to, upon reception of image data transmitted from the transmission unit of the image reading apparatus, determine an image characteristic indicated by the received image data,
- a second determination unit configured to determine whether or not the image characteristic determined by the first determination unit corresponds to the first correction characteristic, and
- a second correction unit configured to, when the second determination unit determines that the image characteristic does not correspond to the first correction characteristic, perform gamma correction of the received image data in accordance with an inverse characteristic of the first correction characteristic and perform gamma correction of the received image data in accordance with a second correction characteristic corresponding to the image characteristic.

\* \* \* \* \*